(12) United States Patent
Skeath et al.

(10) Patent No.: US 6,352,209 B1
(45) Date of Patent: Mar. 5, 2002

(54) GAS ASSISTED ATOMIZING DEVICES AND METHODS OF MAKING GAS-ASSISTED ATOMIZING DEVICES

(75) Inventors: Perry R Skeath, Silver Spring, MD (US); John R Saylor, Alexandria, VA (US); Amy L Rovelstad, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/712,832

(22) Filed: Nov. 13, 2000

Related U.S. Application Data

(62) Division of application No. 08/889,852, filed on Jul. 8, 1997, now Pat. No. 6,189,214.
(60) Provisional application No. 60/021,308, filed on Jul. 8, 1996, provisional application No. 60/021,309, filed on Jul. 8, 1996, and provisional application No. 60/021,310, filed on Jul. 8, 1996.

(51) Int. Cl.$^7$ ................................................. B05B 7/00
(52) U.S. Cl. ........................................................ 239/8
(58) Field of Search ............................................. 239/8

(56) References Cited

U.S. PATENT DOCUMENTS

| | | | |
|---|---|---|---|
| 3,662,960 A | 5/1972 | Mitchell et al. | 239/400 |
| 3,790,086 A | 2/1974 | Masai | 239/406 |
| 3,921,916 A | 11/1975 | Bassous | 239/601 |
| 3,948,442 A | 4/1976 | Dewey | 239/2 S |
| 3,949,410 A | 4/1976 | Bassous et al. | 346/75 |
| 3,958,255 A | 5/1976 | Chiou et al. | 346/140 |
| 4,007,464 A | 2/1977 | Bassous et al. | 346/75 |
| 4,014,029 A | 3/1977 | Lane et al. | 346/1 |
| 4,047,184 A | 9/1977 | Bassous et al. | 346/75 |
| 4,066,491 A | 1/1978 | Ruh et al. | 156/644 |
| 4,106,976 A | 8/1978 | Chiou et al. | 156/644 |
| 4,157,935 A | 6/1979 | Solyst | 156/644 |
| 4,169,008 A | 9/1979 | Kurth | 156/600 |

(List continued on next page.)

FOREIGN PATENT DOCUMENTS

| | | |
|---|---|---|
| DE | 0 617 112 A2 | 9/1994 |
| FR | 2444514 | 7/1980 |
| GB | 1207 877 | 10/1970 |
| JP | 0 249 186 | 12/1987 |
| WO | WO 92/10301 | 6/1992 |

OTHER PUBLICATIONS

G. Brenn et al., A new apparatus for the production of monodisperse sprays at high flow rates, Chemical Engineering Science, vol. 52, No. 2, pp. 237–244, 1997.
H.E. Snyder et al., 20/20 Atomization—using MEMS to obtain 20 $\mu$m sprays with low pressure air (20 psig.), Published May 20, 1997 at ILASS Conference, p. 238–242.
Lefebvre, Atomization and Sprays, 1989 Hemisphere Publishing Corp. pp. 4–10 and 30–31.
Yakovlev S.A., Vibrating–Capillary Generator for Obtaining Test Aerosols with a Diameter of less than 2 Microns, Measurement Techniques, vol. 39, No. 2, 1996, pp. 146–148.
Queiroz, M. et al., Experimental Exploration of the Thermal Structure of an Array of Burning Droplet Streams, Combustion and Flame 82, 1990, pp. 346–360.
Singh A., et al., Micromachined Silicon Fuel Atomizers for Gas Turbine Engines, Case Western Reserve University and Parker Hannifin Corporation, Cleveland, Ohio, pp. 2–17.

*Primary Examiner*—Lesley D. Morris
(74) *Attorney, Agent, or Firm*—Timothy R. Krosh

(57) ABSTRACT

Gas-assisted atomizing devices are provided that include liquid orifices, which release liquid, and gas orifices, which release gas to atomize the liquid into droplets. The atomizing devices are formed by at least a first layer and a second layer. The atomizing devices can include a gas supply network and a liquid supply network that supply gas and liquid to the gas and liquid orifices.

5 Claims, 19 Drawing Sheets

U.S. PATENT DOCUMENTS

Figure 1:
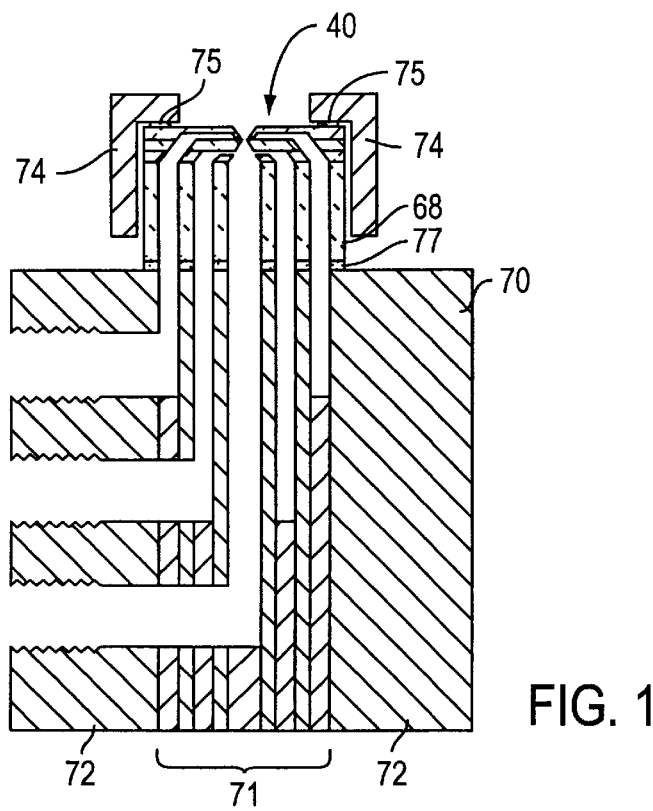
Figure 2:
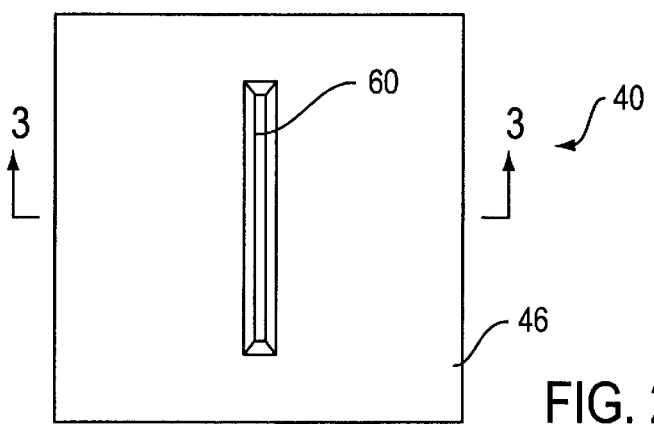
Figure 3:
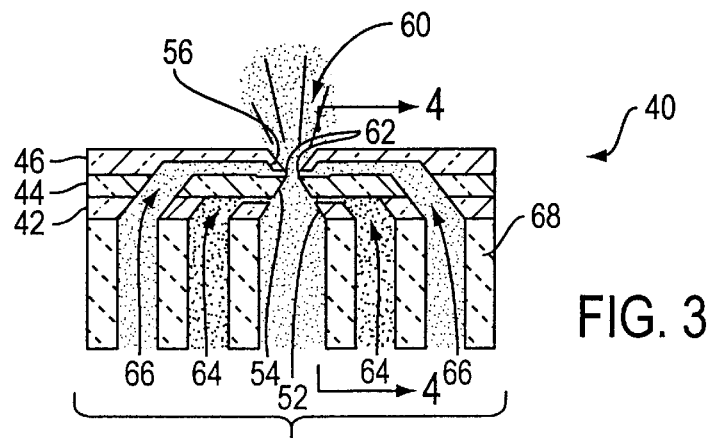
Figure 4:
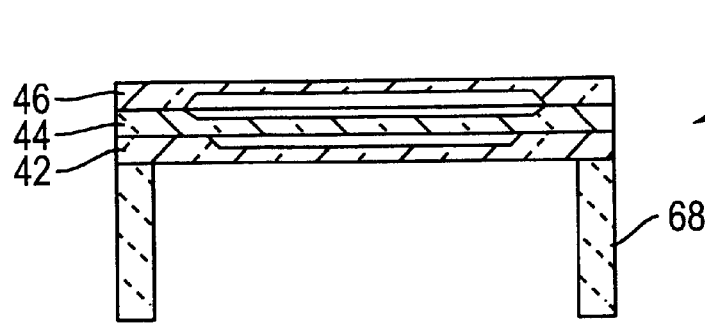

| | | | |
|---|---|---|---|
| 4,216,477 A | 8/1980 | Matsuda et al. | 346/140 |
| 4,223,320 A | 9/1980 | Paranjpe et al. | 346/75 |
| 4,312,008 A | 1/1982 | Taub et al. | 346/140 |
| 4,314,259 A | 2/1982 | Cairns et al. | 346/75 |
| 4,357,614 A | 11/1982 | Tamai | 346/75 |
| 4,455,192 A | 6/1984 | Tamai | 156/628 |
| 4,470,875 A | 9/1984 | Poteat | 156/644 |
| 4,596,364 A | 6/1986 | Bauer | 239/590 |
| 4,601,777 A | 7/1986 | Hawkins et al. | 156/626 |
| 4,612,554 A | 9/1986 | Poleshuk | 346/140 |
| 4,639,748 A | 1/1987 | Drake et al. | 346/140 |
| RE32,572 E | 1/1988 | Hawkins et al. | 156/626 |
| 4,726,522 A | 2/1988 | Kokubo et al. | 239/102.2 |
| 4,768,717 A | 9/1988 | Shay | 239/403 |
| 4,768,751 A | 9/1988 | Giachino et al. | 251/331 |
| 4,789,425 A | 12/1988 | Drake et al. | 156/644 |
| 4,828,184 A | 5/1989 | Gardner et al. | 239/590 |
| 4,857,076 A | 8/1989 | Pearson et al. | 48/86 |
| 4,864,329 A | 9/1989 | Kneezel et al. | 346/140 |
| 4,871,489 A | 10/1989 | Ketcham | 264/9 |
| 4,875,968 A | 10/1989 | O'Neill et al. | 156/633 |
| 4,907,748 A | 3/1990 | Gardner et al. | 239/584 |
| 4,924,097 A | 5/1990 | Browner et al. | 250/343 |
| 4,946,475 A | 8/1990 | Lipp et al. | 48/86 |
| 5,006,202 A | 4/1991 | Hawkins et al. | 156/644 |
| 5,030,971 A | 7/1991 | Drake et al. | 346/140 |
| 5,041,190 A | 8/1991 | Drake et al. | 156/647 |
| 5,068,006 A | 11/1991 | Fisher | 156/633 |
| 5,090,619 A | 2/1992 | Barthold et al. | 239/14.2 |
| 5,119,115 A | 6/1992 | Buat et al. | 346/140 |
| 5,119,116 A | 6/1992 | Yu | 346/140 |
| 5,124,717 A | 6/1992 | Campanelli et al. | 346/1.1 |
| 5,132,707 A | 7/1992 | O'Neil | 346/140 |
| 5,136,310 A | 8/1992 | Drews | 346/140 |
| 5,141,596 A | 8/1992 | Hawkings et al. | 156/628 |
| 5,144,341 A | 9/1992 | El Haten et al. | 346/140 |
| 5,160,577 A | 11/1992 | Deshpande | 156/644 |
| 5,161,742 A | 11/1992 | Hofmann et al. | 239/533.9 |
| 5,165,292 A | 11/1992 | Prohaska | 73/866 |
| 5,167,776 A | 12/1992 | Bhaskar et al. | 205/75 |
| 5,201,987 A | 4/1993 | Hawkins et al. | 156/633 |
| 5,204,690 A | 4/1993 | Lorenze, Jr. et al. | 346/1.1 |
| 5,212,496 A | 5/1993 | Badesha et al. | 346/1.1 |
| 5,256,352 A | 10/1993 | Snyder et al. | 261/78.2 |
| 5,306,370 A | 4/1994 | Herko et al. | 156/155 |
| 5,383,567 A | 1/1995 | Sorathia et al. | 220/4.13 |
| 5,383,597 A | 1/1995 | Sooriakumar et al. | 239/5 |
| 5,402,937 A | 4/1995 | Buchholz et al. | 239/431 |
| 5,421,952 A | 6/1995 | Buchholz et al. | 216/33 |
| 5,435,884 A | 7/1995 | Simmons et al. | 216/100 |
| 5,449,114 A | 9/1995 | Wells et al. | 239/5 |
| 5,873,524 A | 2/1999 | Bodelin et al. | 239/8 |

GAS ASSISTED ATOMIZING DEVICES AND METHODS OF MAKING GAS-ASSISTED ATOMIZING DEVICES

This is a division of application Ser. No. 08/889,852, now U.S. Pat. No. 6,189,214 filed Jul. 8, 1997

The present application claims the benefit of U.S. Provisional Application Nos. 60/021,306, 60/021,308, 60/021,309, and 60/021,310.

BACKGROUND OF THE INVENTION

1. Field of the Invention

The present invention relates to atomizing devices and to methods of making the same and, more particularly, to gas-assisted, micromachined, atomizing devices that produce small droplets and to methods of making the same.

2. Description of the Related Art

Liquid atomizing devices are used in various mechanisms, such as medical nebulizers and fuel injectors for combustion chambers. The performance of many of these mechanisms can be improved if the atomizing device provides a spray with very small droplets. For example, small droplets improve the effectiveness of medical nebulizers because small droplets (e.g., between 2 and 5 micrometers) can be inhaled deep into the lungs. Additionally, small droplets (e.g., less than 20micrometers) improve the efficiency of combustion devices by causing faster vaporization of the fuel.

Conventional atomizing devices typically provide a spray having droplets within a wide range of sizes, including a small percentage of droplets that have a Sauter mean diameter smaller than 10 micrometers. Conventional atomizing devices have rarely been able to provide a spray having droplets limited to a small range of sizes and having a Sauter mean diameter smaller than 10 micrometers, without employing additional mechanisms such as ultrasonic power or high-voltage electrostatic charging.

The failure of conventional atomizing devices to provide a small range and small droplets can be attributed to the manner in which these devices perform atomization. Conventional atomizing devices break bulk liquid into relatively large ligaments, break the ligaments into relatively large drops through atomization, and break the large drops into smaller droplets through secondary atomization. As the droplets become smaller than 100 micrometers, they become harder to break, and secondary atomization typically ceases, thus preventing most of the droplets from becoming as small as 10 micrometerss. Also, since the bulk liquid is much larger than the desired droplet size and, therefore, must be broken down a number of times to become relatively small, the droplets ultimately formed by conventional devices will have a relatively wide size range.

Efforts have been made to decrease droplet size by increasing the amount of gas forced through the atomizing device. However, this results in a large gas-liquid mass ratio, which is undesirable for many applications because it requires a large gas pump, a large amount of gas, and a high gas velocity.

Another problem associated with conventional atomizing devices is that two devices, even of the same type, often will have different spray characteristics. These differing spray characteristics result from very minor variations in the structure of the atomizing device. With current manufacturing methods, these variations occur more frequently than is desired.

SUMMARY OF THE INVENTION

An object of the present invention is to provide an atomizing devices that solve the foregoing problems.

Another object of the present invention is to provide atomizing devices that produce a spray having droplets with a Sauter mean diameter of 10 micrometerss or smaller.

Yet another object of the present invention is to provide atomizing devices that produce a spray having droplets within a small range of diameters.

Yet another object of the present invention is to provide atomizing devices having a small gas-liquid mass ratio.

Yet another object of the present invention is to provide atomizing devices of very small size.

Yet another object of the present invention is to provide atomizing devices that can be mass produced and that, nevertheless, have consistent spray characteristics from device to device.

Additional objects and advantages of the invention will become apparent from the description which follows. Additional advantages may also be learned by practice of the invention.

In a broad aspect, the invention provides a method of atomizing a liquid, comprising the steps of flowing a liquid over an atomizing edge of an orifice, and flowing a gas against the liquid to cause atomization of the liquid into droplets having a Sauter mean diameter smaller than 35 micrometers at a gas-liquid mass ratio of less than or equal to 0.2.

In another broad aspect, the invention provides a method of atomizing a liquid, comprising the steps of flowing a liquid over an atomizing edge of an orifice, and flowing a gas against the liquid to cause primary atomization of the liquid into droplets having a Sauter mean diameter smaller than a critical diameter $D_{max}$ of the droplets, where:

$$D_{max}=8\sigma/(C_{D}\rho_{A}U_{R}^{2})$$

where:

σ: surface tension of the liquid;

$C_D$: drag coefficient of a droplet having a diameter equal to the critical diameter;

$\rho_a$: density of the gas; and $U_R$: relative velocity between the droplet and the gas.

In another broad aspect, the invention provides an atomizing device comprising a substantially planar first layer having a first opening therethrough, and a substantially planar second layer having a second opening therethrough and being laminated to the first layer such that the first and second openings are aligned to form a main gas orifice that guides a main gas in a flow direction, the second opening being bounded by at least one inner surface with at least one atomizing edge, wherein the first and second layers define at least one liquid orifice that supplies liquid to be atomized onto the at least one inner surface of the second layer where the liquid forms a thin film.

In another broad aspect, the invention provides a method of forming an atomizing device, comprising the steps of forming a first opening in a substantially planar first layer, forming a second opening in a substantially planar second layer, the second opening having at least one inner surface with an atomizing edge, forming at least one liquid orifice in at least one of the first and second layers, and connecting the first and second layers such that the first and second openings are aligned to form a main gas orifice that guides a main gas in a flow direction and such that the liquid orifice supplies liquid to be atomized onto the at least one inner surface of the second opening.

In another broad aspect, the invention provides a gas-assisted atomizing device comprising a substantially planar first layer, and a substantially planar second layer having a plurality of orifices formed therein, wherein the first and second layers form a gas supply network including a plurality of gas channels that supply gas to at least some the plurality of orifices, and a liquid supply network including a plurality of liquid channels that supply liquid to at least some of the plurality of orifices.

In another broad aspect, the invention provides a method of forming a gas-assisted atomizing device, comprising the steps of forming a gas supply network and a liquid supply network in a substantially planar first layer and a substantially planar second layer, forming a plurality of orifices in the second layer for releasing a spray, and connecting the first and second layers such that the gas and liquid supply networks supply gas and liquid to form a spray at the plurality of orifices.

In another broad aspect, the invention provides a gas-assisted atomizing device comprising a substantially planar first layer, and a substantially planar second layer having a plurality of liquid orifices and a plurality of gas orifices formed therein. The first and second layers form a liquid supply network including a plurality of liquid channels that supply liquid to the plurality of liquid orifices and force liquid through the liquid orifices to form streams of liquid, and a gas supply network including a plurality of gas channels that supply gas to the plurality of gas orifices and force gas through the gas orifices to atomize the streams of liquid.

It is to be understood that both the foregoing summary and the following detailed description are exemplary and explanatory only and are not restrictive of the invention, as claimed.

BRIEF DESCRIPTION OF THE DRAWINGS

The invention will be described in conjunction with the accompanying drawings, which illustrate presently preferred embodiments of the invention.

FIG. 1 is a sectional view of a first embodiment of an atomizing device according to the present invention, a submount, and a distribution device.

FIG. 2 is a top view of the first embodiment.

FIG. 3 is a sectional view of the first embodiment taken along line 3—3 of FIG. 2.

FIG. 4 is a sectional view of the first embodiment taken along line 4—4 of FIG. 2.

FIG. 5 is a top view of a second embodiment of an atomizing device according to the present invention.

FIG. 6 is a sectional view of the second embodiment taken along line 6—6 of FIG. 5.

FIG. 7 is a top view of a third embodiment of an atomizing device according to the present invention.

FIG. 8 is a sectional view of the third embodiment taken along line 8—8 of FIG. 7.

FIG. 9 is a top view of a fourth embodiment of an atomizing device according to the present invention.

FIG. 10 is a sectional view of the fourth embodiment taken along line 10—10 of FIG. 9.

FIG. 11 is a sectional view of a fifth embodiment of an atomizing device according to the present invention.

FIG. 12 is a sectional view of a sixth embodiment of an atomizing device according to the present invention.

FIG. 13 is a top view of a wafer having a plurality of atomizing devices.

FIG. 14 is a top view of a seventh embodiment of an atomizing device according to the present invention.

FIG. 15 is a sectional view of the seventh embodiment taken along line 15—15 of FIG. 14.

FIG. 16 is a sectional view of the seventh embodiment taken along line 16—16 of FIG. 14.

FIG. 17 is a top view of an eighth embodiment of an atomizing device according to the present invention.

FIG. 18 is a top view of a ninth embodiment of an atomizing device according to the present invention.

FIG. 19 is a top view of a tenth embodiment of an atomizing device according to the present invention.

FIG. 20 is a top view of an eleventh embodiment of an atomizing device according to the present invention.

FIG. 21 is a sectional view of a twelfth embodiment of an atomizing device according to the present invention.

FIG. 22 is a further sectional view of the twelfth embodiment.

FIG. 23 is a top view of a thirteenth embodiment of an atomizing device according to the present invention.

FIG. 24 is a sectional view of the thirteenth embodiment taken along line 24—24 of FIG. 23.

FIG. 25 is a top view of a fourteenth embodiment of an atomizing device according to the present invention.

FIG. 26 is a sectional view of the fourteenth embodiment taken along line 26—26 of FIG. 25.

FIG. 27 is a sectional view of a fifteenth embodiment of an atomizing device according to the present invention.

FIG. 28 is a sectional view of a sixteenth embodiment of an atomizing device according to the present invention.

FIG. 29 is a schematic diagram of a fluid distribution network of a seventeenth embodiment of an atomizing device according to the present invention.

FIG. 30 is an enlarged view of a portion of the fluid distribution network of FIG. 29.

FIG. 31 is a sectional view of the seventeenth embodiment taken along line 31—31 of FIG. 29.

FIG. 32 is a sectional view of the seventeenth embodiment taken along line 32—32 of FIG. 29.

FIG. 33 is a sectional view of the seventeenth embodiment taken along line 33—33 of FIG. 29.

FIG. 34 is a sectional view of the seventeenth embodiment taken along line 34—34 of FIG. 29.

FIG. 35 is a top view of an eighteenth embodiment of an atomizing device according to the present invention.

FIG. 36 is a sectional view of the eighteenth embodiment taken along line 36—36 of FIG. 35.

DESCRIPTION OF THE PREFERRED EMBODIMENTS

Reference will now be made in detail to the preferred embodiments illustrated in the drawings.

As shown generally in FIGS. 1 to 4, a first embodiment of an atomizing device 40 according to the present invention includes a substantially planar first layer 42, a substantially planar second layer 44, and a substantially planar third layer 46. Each of the first, second, and third layers preferably has a length of 10 millimeters, a width of 10 millimeters, and a thickness of 1 millimeter.

The first, second, and third layers 42, 44, and 46 are preferably made of a material that can be micromachined and precisely fused together. More preferably, the first, second, and third layers are formed of an etchable material, such as an elemental semiconductor material or silicon carbide. Suitable semiconductor materials include (100) orientation silicon, polycrystalline silicon, and germanium. Unless indicated otherwise in this specification, it is presently preferred that the layers of this embodiment and the other embodiments be made of (100) orientation silicon.

The first layer 42, second layer 44, and third layer 46 have a first opening 52, second opening 54, and third opening 56, respectively. The openings form a main gas orifice 60 that guides a main gas in a flow direction. In this embodiment, each of the first, second, and third openings 52, 54, and 56 is defined by four inner surfaces that each have a substantially rectangular shape.

The four inner surfaces of the first opening 52 and the four inner surfaces of the second opening 54 converge in the flow direction. These converging inner surfaces accelerate the main gas, which improves the efficiency of atomization and assists in moving the liquid to atomizing edges 62 provided on two of the inner surfaces of the second opening 54. Generally, an atomizing edge is a corner or edge of a wall or surface over which a liquid flows in a thin layer, where a high-velocity gas flow breaks the thin liquid layer into ligaments or droplets.

The four inner surfaces of the third opening 56 diverge in the flow direction. These diverging inner surfaces decelerate the main gas, which provides a less turbulent spray plume.

The atomizing edges 62 on the inner surfaces of the second opening 54 are preferably separated by a width of not more than 250 micrometers, which concentrates the gas flow at the atomizing edges 62 where the gas interacts most strongly with the liquid. The ratio of the smallest atomizing perimeter (i.e., the length of an atomizing edge in an orifice) of the second opening 54 to cross-sectional area of the second opening 54 in the plane of that perimeter is preferably at least 8,000 meters$^{-1}$, which improves atomization efficiency and lowers the gas-liquid mass ratio.

The first and second layers 42 and 44 form two sets of liquid orifices and channels 64 that each supply liquid to be atomized onto the respective inner surfaces of the second opening 54. The liquid forms thin films having substantially uniform thicknesses at the exit of the liquid orifices 64. The liquid film is further thinned as it is drawn over the inner surfaces of the second opening 54. The liquid orifices and channels 64 can be formed by providing cavities in the first layer 42, the second layer 44, or both.

Liquid forced through the liquid orifices 64, at a flow rate of, for example, 5 milliliters per minute, will form thin films on the inner surfaces of the second opening 54. The thin films of liquid are drawn, and further thinned, by the high-velocity gas flow to the atomizing edges 62, where the main gas forced through the main gas supply orifice 60, at a flow rate of, for example, 5 liters per minute, breaks the liquid into ligaments and breaks the ligaments into droplets through primary atomization.

The atomizing device preferably also includes two sets of auxiliary gas orifices and channels 66, one on each side of the main gas orifice 60, which are formed by the first, second, and third layers 42, 44, and 46. The auxiliary gas orifices and channels 66 can be formed by providing cavities in the first layer 42 and the second or third layer 44 or 46, or both. The auxiliary gas orifices 66 supply high-velocity gas to the atomizing edges 62. The auxiliary gas orifices and channels 66 are designed so that the auxiliary gas does not become turbulent under standard operating conditions.

Gas forced out of the auxiliary gas orifices 66, at a flow rate of, for example, 1 liter per minute, impinges on the liquid at the atomizing edges 62, effectively pinching the liquid between the main and auxiliary gas flows. The auxiliary gas thus aids the main gas in the formation of ligaments at the atomizing edges 62 by preventing liquid accumulation on the downstream side of the atomizing edges 62 and by shearing off the liquid between the main and auxiliary gas flows, forming fine ligaments.

The atomizing device 40 of the first embodiment can be produced in batches, similar to the production of batches of integrated circuits. For example, as shown in FIG. 13, a wafer is processed so as to have a plurality of sections that each constitute a third layer 46 of an atomizing device. These sections each have a third opening 56 and portions of auxiliary gas orifices and channels (not visible in FIG. 13). Similarly, another wafer is processed so as to have a plurality of sections that each constitute a second layer 44 of an atomizing device, and yet another wafer is processed so as to have a plurality of sections that each constitute a first layer 42 of an atomizing device. The wafers are aligned and connected to form a batch of atomizing devices, which are separated and connected to respective mounting structures. Alternatively, the atomizing devices could be connected to their respective mounting structures before separation.

For ease of reference, the following, more specific, description of the manufacture of an atomizing device according to the present invention will be provided with reference to only one of the plurality of atomizing devices. The following description specifies certain processes that are presently preferred for micromachining the silicon layers. Unless otherwise indicated in this specification, the use of these processes is presently preferred for micromachining the silicon layers of all of the disclosed embodiments.

Initially, a mask layer is deposited or grown on a first side of the first layer 42 and an etch pattern is then transferred into the mask layer in accordance with conventional techniques used in the production of integrated circuits. The first side of the first layer 42 is etched to form a portion of the first opening 52, a portion of the liquid orifice and channel 64, and a portion of the auxiliary gas orifice and channel 66. Preferably, the first side is etched using a crystallographic etch, such as a potassium hydroxide etch, which is known for use in the production of integrated circuits. A crystallographic etch is useful because it causes the silicon to etch much faster along the (100) crystal axis compared to the (111) direction, which results in angled surfaces (54.7 degrees relative to the plane of the layer) in the (100)-oriented first layer 42.

A mask layer is deposited on a second side of the first layer 42 with an etch pattern aligned with the etch on the first side. The second side is etched to form a portion of the first opening 52, a portion of the liquid orifice and channel 64, and a portion of the auxiliary gas orifice and channel 66, using a crystallographic etch.

The second layer 44 is etched in the same manner as the first layer 42 to form the second opening 54 and a portion of the auxiliary gas orifice and channel 66. If desired, the second layer 44 could be etched to form a portion of the liquid orifice and channel 64.

The third layer 46 is also etched in the same manner as the first layer 42 to form the third opening 56 and a portion of the auxiliary gas orifice and channel 66.

The first, second, and third layers 42, 44, and 46 are then connected to form the atomizing device. Silicon fusion bonding, with or without a flowable layer (e.g., borophosphosilicate glass or phosphosilicate glass) or an alloying layer (e.g., copper thin film), is the presently preferred process for connecting two silicon layers in this and the other embodiments.

FIG. 1 shows a presently preferred arrangement for providing the main gas, auxiliary gas, and liquid to the atomizing device. This arrangement includes a submount 68 and a distribution device 70.

The submount 68 has channels for feeding the main gas, auxiliary gas, and liquid to the respective channels of the atomizing device 40. Preferably, the submount 68 is made of PYREX. Anodic bonding is the presently preferred process for connecting a PYREX member to a silicon member in this and other embodiments. The channels of the submount 68 are preferably formed by an ultrasonic machining process, since the channels are narrow and the walls between the channels are thin. Ultrasonic machining is a presently preferred process for forming channels in PYREX when the channels do not extend completely through the layer, the channels are narrow, or there are thin walls between the channels. Abrasive liquid jet machining of PYREX is an alternative process that is preferred when the channels extend completely through the layer, the channels are not narrow, and the walls are thick.

The distribution device 70 has passages for distributing the main gas, auxiliary gas, and liquid to the respective channels of the submount 68. Laminations 71 and two outer members 72 form these passages. The laminations 71 and outer members 72 are preferably made of metal.

The distribution device also includes clamps 74 made of a rigid material, such as metal or a rigid plastic, which hold the atomizing device 40 on the distribution device 70. When the clamps 74 are made of hard metal, pads 75 formed of an elastomer can be provided to prevent chipping or breakage of the atomizing device 40.

The submount 68 and distribution device 70 are preferably connected by a sealing gasket 77 made of a thin sheet of adhesive, such as PYRALUX adhesive (E.I. Du Pont De Nemours and Co. (Inc.)), or a thin sheet of an adhesive polyimide, such as KAPTON KJ (DuPont High Performance Films). Alternatively, they may be joined by anodic bonding.

FIGS. 5 to 12 show embodiments of atomizing devices that are similar in many respects to the first embodiment shown in FIGS. 1 to 4. Differences between these embodiments and the first embodiment are described below.

Figure 5:
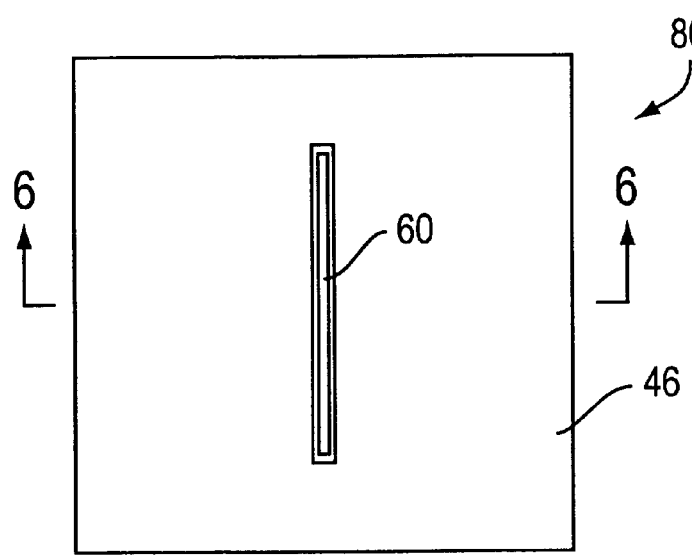
Figure 6:
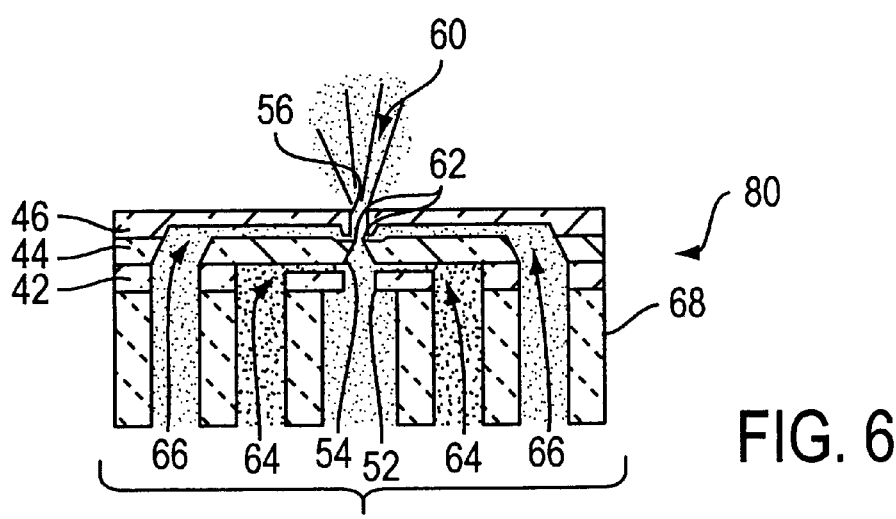
Figure 7:
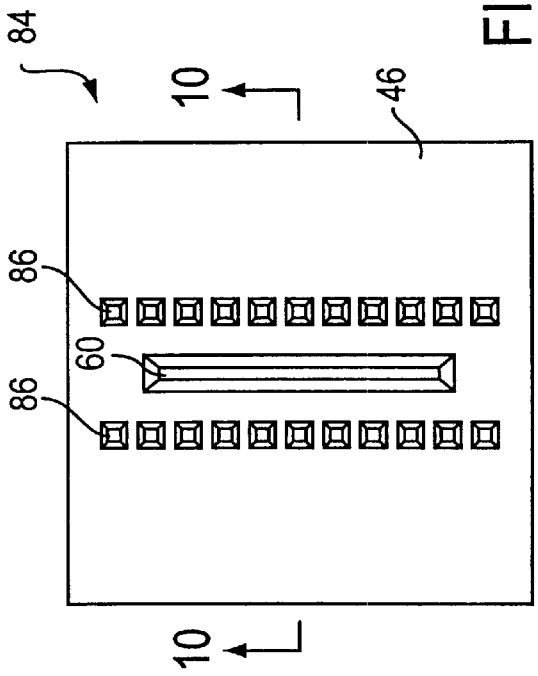
Figure 9:
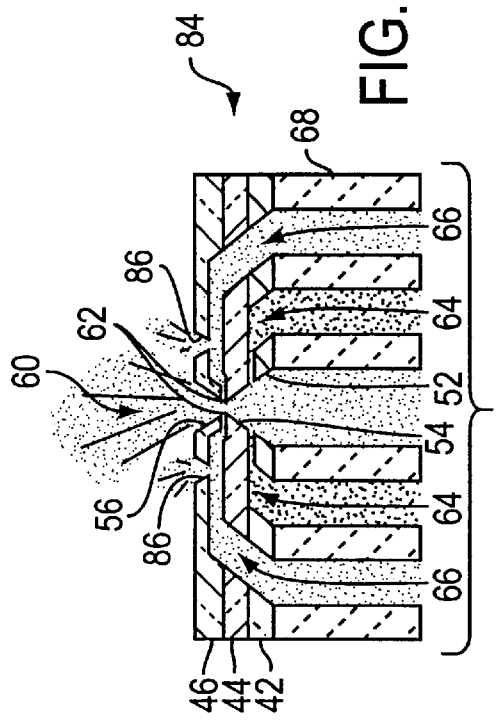
Figure 8:
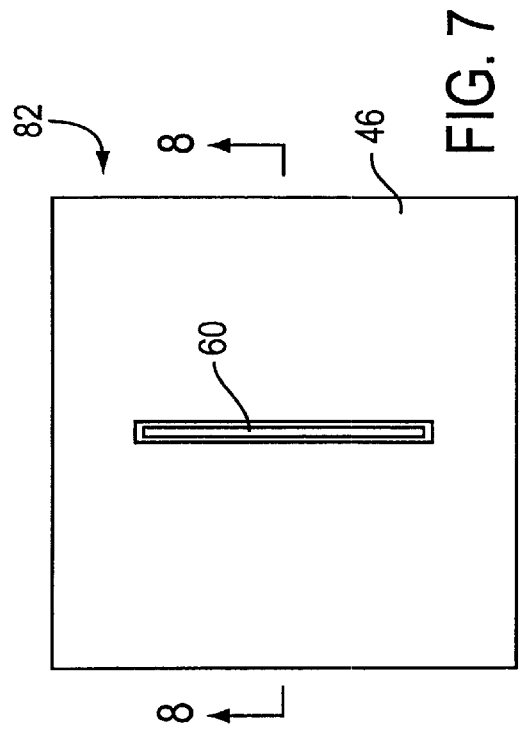
Figure 10:
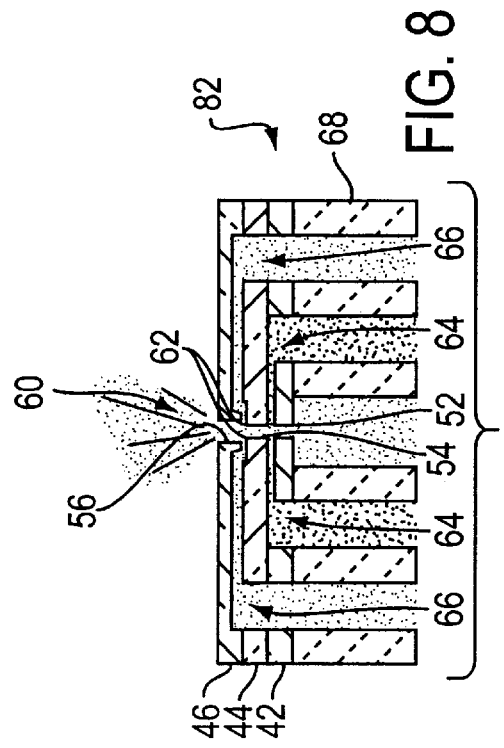
Figure 13:
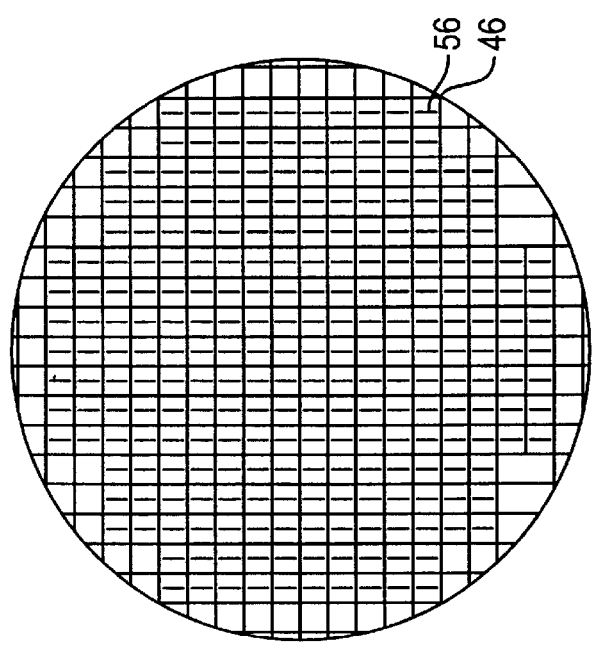
Figure 11:
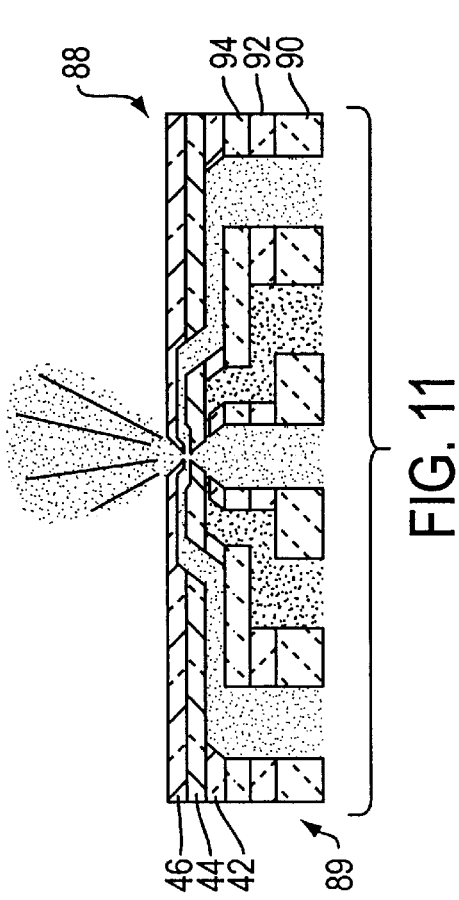
Figure 12:
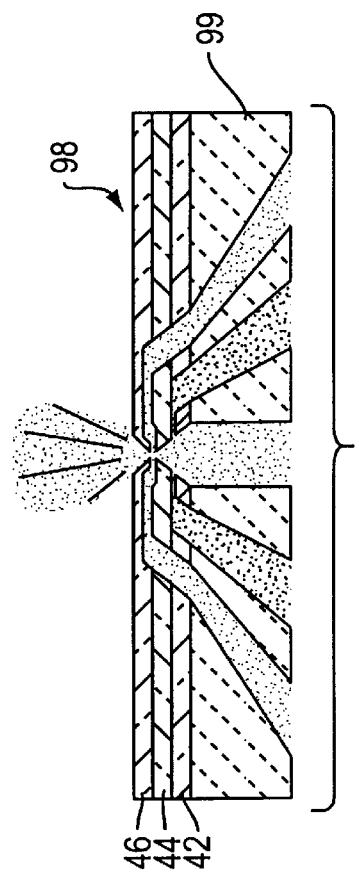

A second embodiment of an atomizing device 80 is shown in FIGS. 5 and 6. In this embodiment, the inner surfaces of the first opening 52, the third opening 56, and all the inner surfaces forming the orifices and channels 66 and 64 of the first layer 42 extend substantially parallel to the flow direction. Since the inner surfaces of the third opening 56 extend parallel to the flow direction, they will condition the spray of droplets before it discharges from the atomizing device 80 and will provide a stable detachment point for the gas flow and thus will help reduce turbulence in the spray plume outside of the atomizing device 80.

Figure 14:
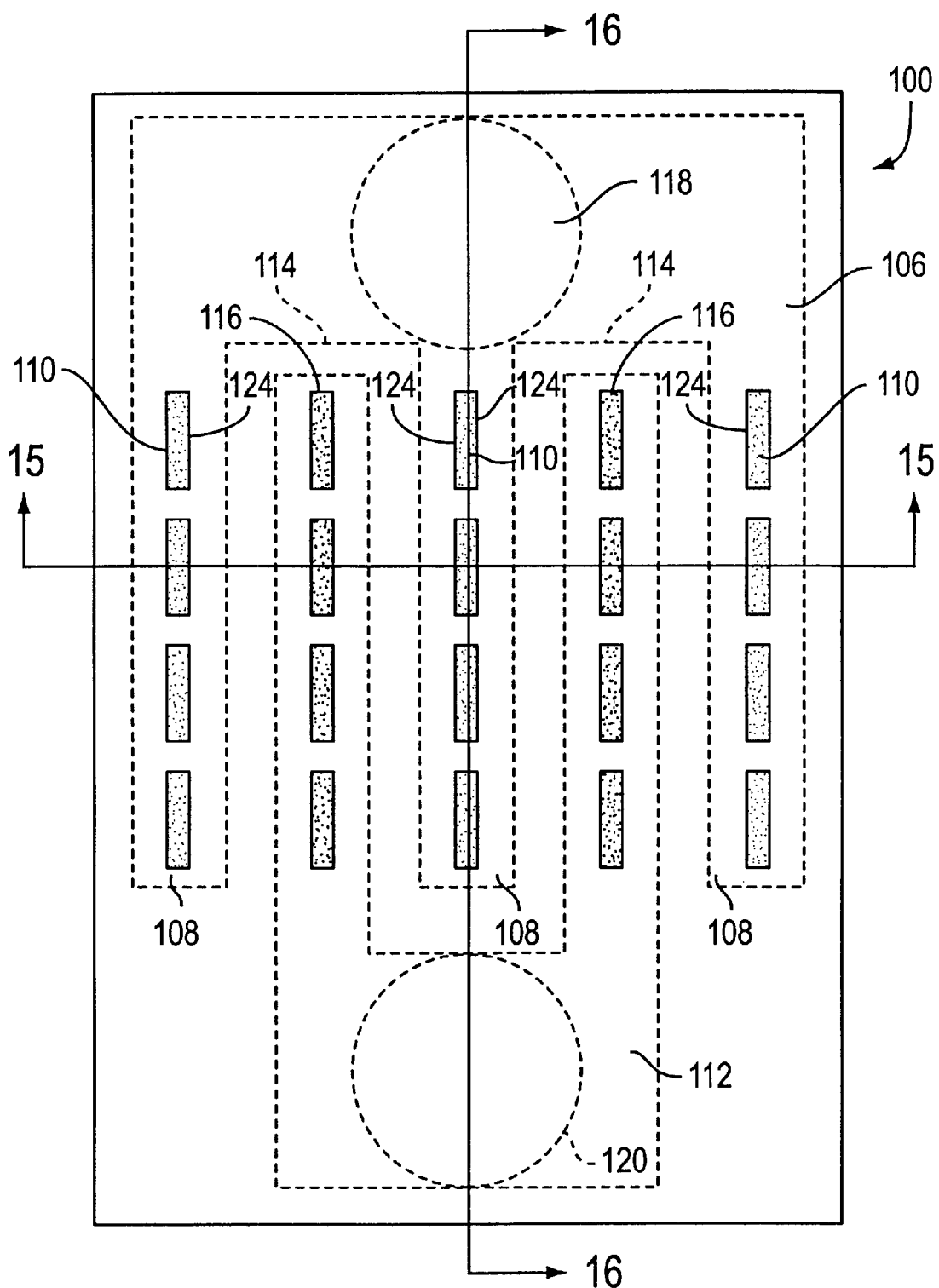

The inner surfaces of the atomizing device 80 that extend parallel to the flow direction are formed by a different process than the corresponding angled inner surfaces of the atomizing device 40 of the first embodiment. Specifically, these parallel surfaces are preferably formed by using a vertical-wall micromachining process, such as a silicon deep-trench reactive ion etch (RIE) process, a vertical-wall photoelectrochemical (PEC) silicon etch process (as described in Richard Mlcak, Electrochemical and Photo Electrochemical Micromachining of Silicon in HF Electrolytes (1994) (thesis, Massachusetts Institute of Technology) which is hereby incorporated by reference), a hydroxide-based silicon etch, or ultrasonic machining of silicon or PYREX.

Since the inner surfaces of the first layer 42 all extend parallel to the flow direction, they are all formed using a vertical-wall micromachining process. The third layer 46 is formed by a combination of processes because it has parallel surfaces in the third opening 56 and angled surfaces that form a portion of the auxiliary gas orifice and channel 66. The inner surfaces of the third opening 56 are formed by masking the first side of the third layer 46 and performing a vertical-wall micromachining process. The inner surfaces of the portion of the auxiliary gas orifice and channel 66 are formed by masking the second side of the third layer 46 and performing a crystallographic etch process.

A third embodiment of an atomizing device 82 is shown in FIGS. 7 and 8. In this embodiment, the inner surfaces of the first, second, and third openings 52, 54, and 56 and the inner surfaces of the orifices and channels 64 and 66 of the first, second, and third layers 42, 44, and 46 all extend substantially parallel to the flow direction. Since all the inner surfaces extend parallel to the flow direction, they all can be formed using a vertical-wall micromachining process.

A fourth embodiment of an atomizing device 84 is shown in FIGS. 9 and 10. In this embodiment, additional openings 86 are provided in the third layer 46 (the openings are preferably produced by the same etch used for the third opening 56). The openings 86 form auxiliary gas flows on opposite sides of the atomized liquid. The auxiliary gas flows reduce the tendency of the spray of droplets to fan out. The auxiliary gas flows can also create a gas shield around the spray of droplets to shield the spray from the atmosphere.

A fifth embodiment of an atomizing device 88 is shown in FIG. 11. In this embodiment, a manifold 89 is provided to increase the distance between inlets for the main gas, auxiliary gas, and liquid. This manifold 89 also renders unnecessary the submount 68. The manifold 89 is constituted by first, second, and third manifold layers 90, 92, and 94.

The first and third manifold layers 90 and 94 are preferably made of PYREX, which can be anodically bonded to the adjacent silicon layers. The channels in the first and third manifold layers are preferably formed by ultrasonic machining. The second manifold layer 92 is preferably made of silicon, and the channels in the second manifold layer 92 are preferably formed by a vertical-wall micromachining process or a crystallographic etching process.

A sixth embodiment of an atomizing device 98 is shown in FIG. 12. In this embodiment, a manifold 99, formed in a single layer, is provided to increase the distance between the inlets for the main gas, auxiliary gas, and liquid. The manifold 99 is preferably made of PYREX. The channels in the manifold 99 are preferably formed by ultrasonic machining.

A seventh embodiment of an atomizing device 100 is shown in FIGS. 14 to 16. The atomizing device includes a substantially planar first layer 102 and a substantially planar second layer 104. Each of the first and second layers 102 and 104 preferably has a length of 5 millimeters, a width of 5 millimeters, and a thickness of 1 millimeter.

The first and second layers 102 and 104 form a gas passage 106 and a plurality of gas channels 108 that supply gas to a plurality of gas orifices 110 formed in the second layer 104. The first and second layers 102 and 104 also form a liquid passage 112 and a plurality of liquid channels 114 that supply liquid to a plurality of liquid orifices 116 formed in the second layer 104. As shown in FIG. 14, the gas channels 108 and liquid channels 114 are preferably interdigitated.

Gas is supplied to the gas passage 106 through a gas port 118. Similarly, liquid is supplied to the liquid passage 112 through a liquid port 120. The liquid port 120 preferably has a filter 122 at its inlet to remove impurities from the liquid to prevent clogging of the liquid orifices 116. The filter 122 preferably has extremely fine filter pores that can, for example, be circular or square. The filter pores preferably have widths less than or equal to ⅓ of the width of the liquid orifices 116.

The width of the liquid orifices 116 is preferably less than 75 micrometers. Preferably, for an orifice where atomization is occurring (the gas orifices in this embodiment), a ratio of a smallest atomizing perimeter of the orifice to a cross-sectional area of the orifice is at least 8,000 meters$^{-1}$.

The width of each of the gas channels 108 and liquid channels 114 is preferably less than 200 micrometers. The width of the gas orifices 110 is preferably less than or equal to ten times the Sauter mean diameter of the droplets of atomized liquid at an average air velocity of 100 meters per second in the gas orifices. The Sauter mean diameter is determined at a location spaced from the surface of the atomizing device by a distance that is 10 to 100 times the width of the gas orifices 110. This provides the advantage of low gas-liquid mass ratio.

In relative terms, the width of each of the liquid channels 114 is preferably less than or equal to ten times the width of each of the liquid orifices 116. The width of each of the liquid channels is preferably less than or equal to fifty times a smallest width of the liquid orifices 116. This allows for closer spacing of the gas and liquid orifices 110 and 116. The thickness of each of the liquid orifices 116 is also preferably less than or equal to four times a width of the liquid orifice 116. This allows for more channels per square millimeter of the array of atomizing orifices.

Liquid forced through the liquid orifices 116 at, for example, a flow rate of 10 milliliters per minute per square millimeter of surface occupied by the array of orifices will move across the surface of the second layer 104 to atomizing edges 124 of the gas orifices 110. Gas forced through the gas orifices 110, at a flow rate of, for example, 1 standard liter per minute per square millimeter of surface occupied by the array of orifices, breaks the liquid at the atomizing edges 124 into ligaments and breaks the ligaments into droplets through primary atomization.

The atomizing device 100 of this seventh embodiment can be produced in batches on wafers, similar to the atomizing device of the first embodiment. The inner surfaces of each layer are preferably formed using a vertical-wall micromachining process, because this allows a higher density of supply channels and therefore, allows greater flow capacity per square millimeters of the atomizing array.

However, in this embodiment and later-described embodiments, an etch stop is provided in the second layer 104 at a location corresponding to the bottom of the orifices 110 and 116 and the top of the channels 108 and 114. The etch stop can be provided by known methods such as diffusion, ion implantation and epitaxial growth, and wafer bonding and thinning. Although the wafer bonding and thinning process requires the use of two layers to form an etch stop, the product formed by this process will be considered a single first layer 104 in this specification. It should be noted that the formation of oxygen precipitants can be reduced by avoiding heating the first layer in the range of 600 to 1000° C. for an extended period of time and by using wafers with low oxygen content.

The first and second layers 102 and 104 are then preferably connected by silicon fusion bonding to form the atomizing device 100.

FIGS. 17 to 20 show embodiments of atomizing devices that have the same structure as the seventh embodiment, except for different arrangements of the gas and liquid orifices. The top views shown in FIGS. 17 to 20 are enlarged relative to the top view shown in FIG. 14 for ease of illustration.

Figure 17:
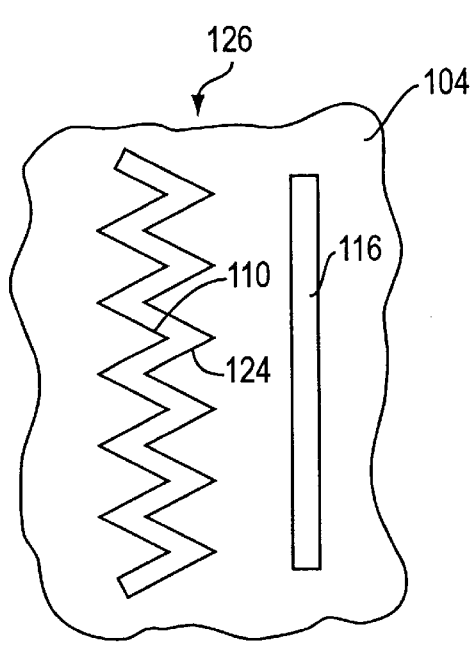

As shown in FIG. 17, the gas orifice 110 of the eighth embodiment 126 has a zig-zag shape. This shape provides more perimeter for atomization, i.e., a longer atomizing edge 124, which increases atomization performance.

Figure 18:
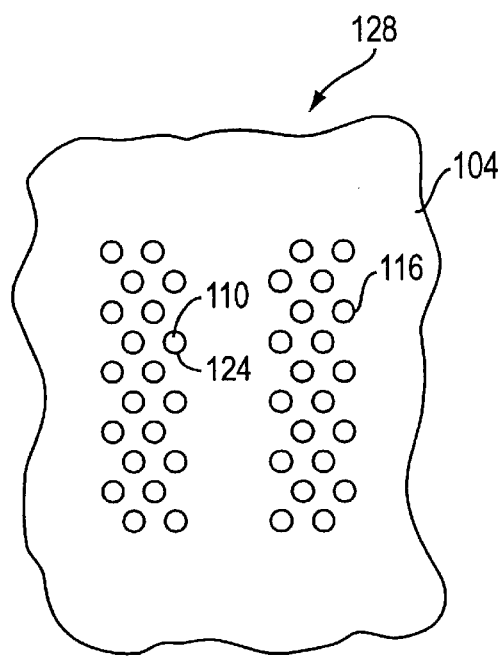

As shown in FIG. 18, the gas and liquid orifices 110 and 116 of the ninth embodiment 128 are formed by a plurality of cylinders.

Figure 19:
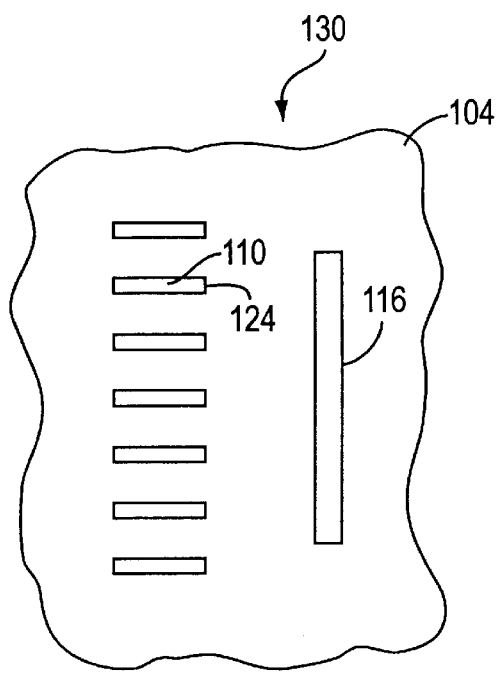

As shown in FIG. 19, the gas orifices 110 of the tenth embodiment 130 have slot shapes that extend perpendicular to the liquid orifices 116. This arrangement provides additional perimeter for atomization.

Figure 20:
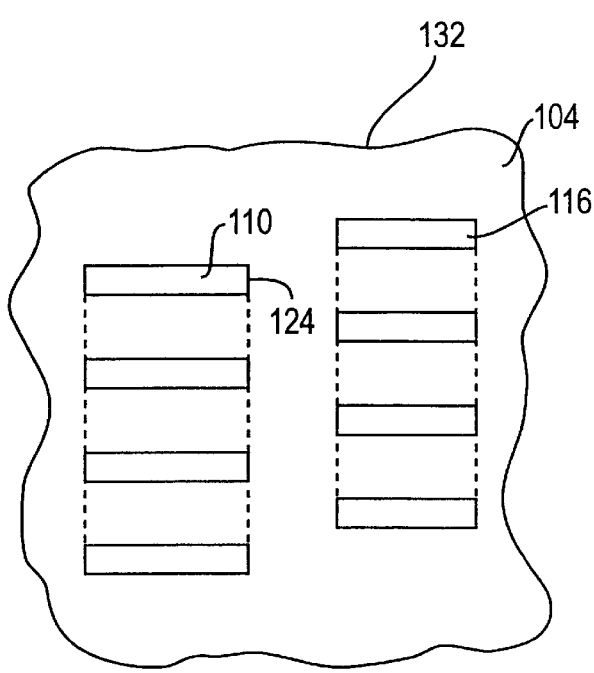

As shown in FIG. 20, the gas and liquid orifices 110 and 116 of the eleventh embodiment 132 are slot shaped and offset. This arrangement provides additional perimeter for atomization.

Figure 21:
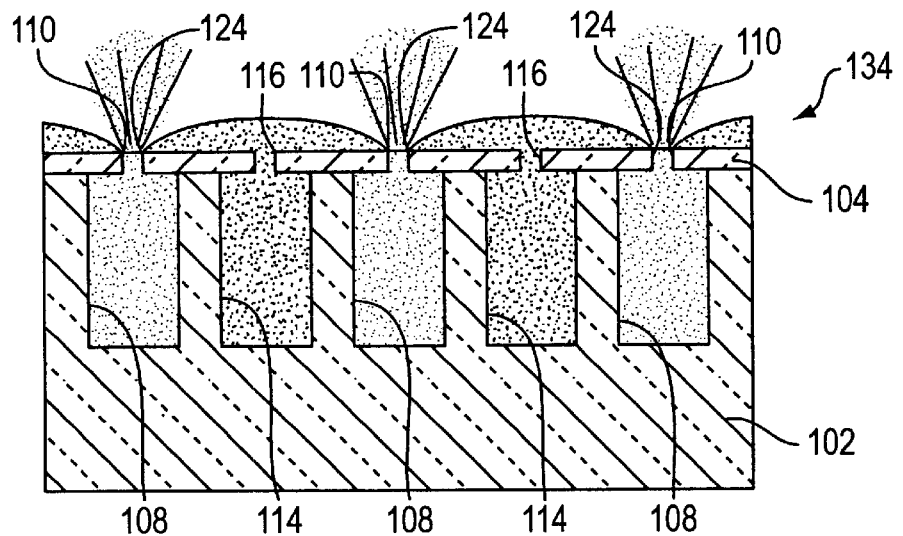
Figure 22:
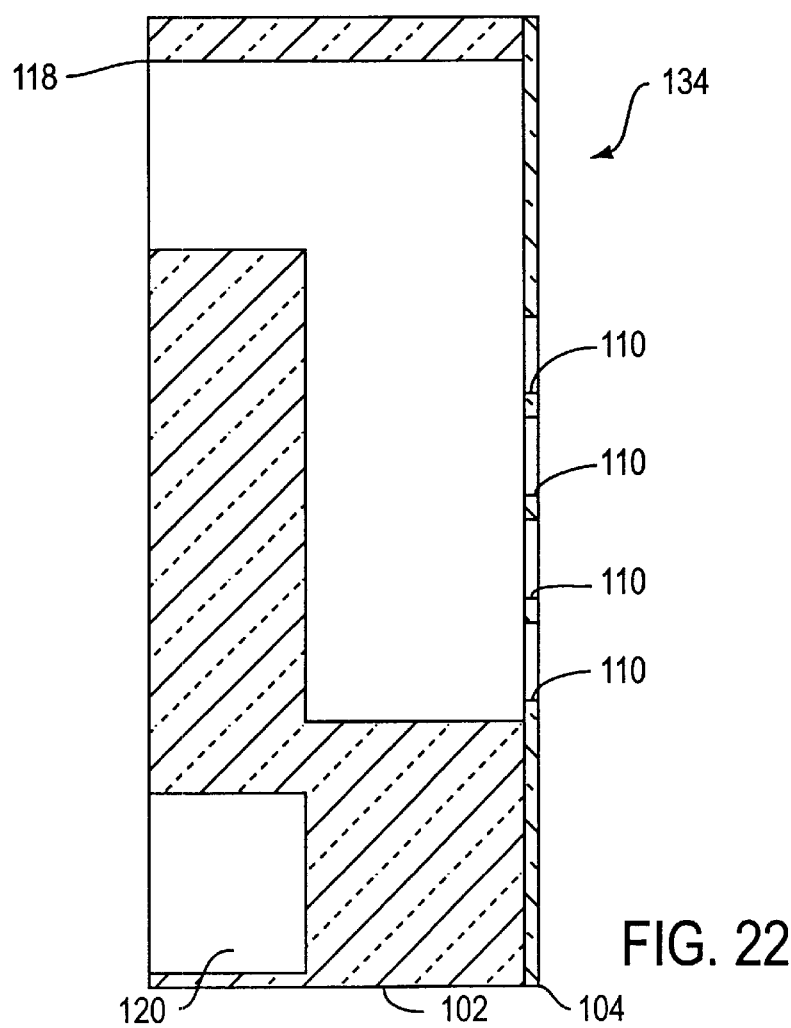

FIGS. 21 and 22 show a twelfth embodiment of an atomizing device 134. This embodiment is the same as the seventh embodiment, except the second layer 104 is relatively thin, having a thickness of preferably less than four times the width of the liquid orifices 116, and the liquid orifice aspect ratio (the ratio of orifice thickness to orifice width) is less than four. The gas and liquid orifices 110 and 116 are formed in the second layer 104. The gas and liquid channels 108 and 114 are formed primarily in the first layer 102.

The surfaces of the first and second layers 102 and 104 are preferably formed by a vertical-wall micromachining process. The first and second layer 102 and 104 are then aligned and connected by silicon fusion bonding.

Figure 23:
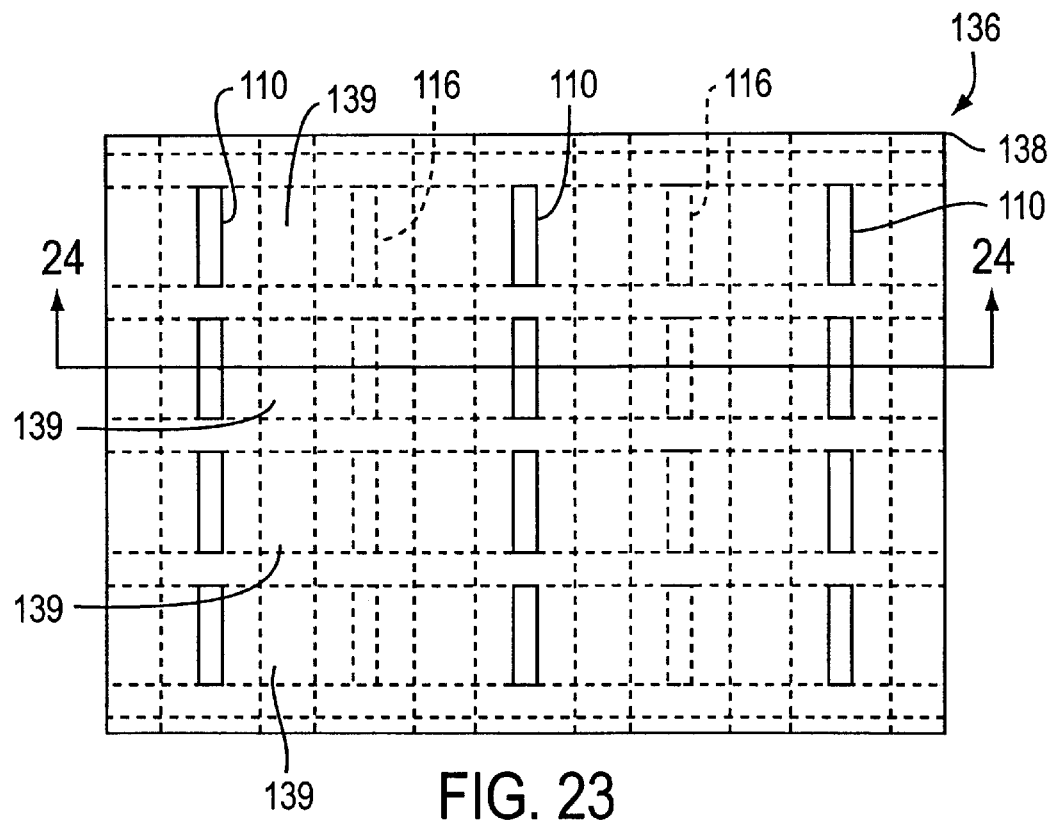
Figure 24:
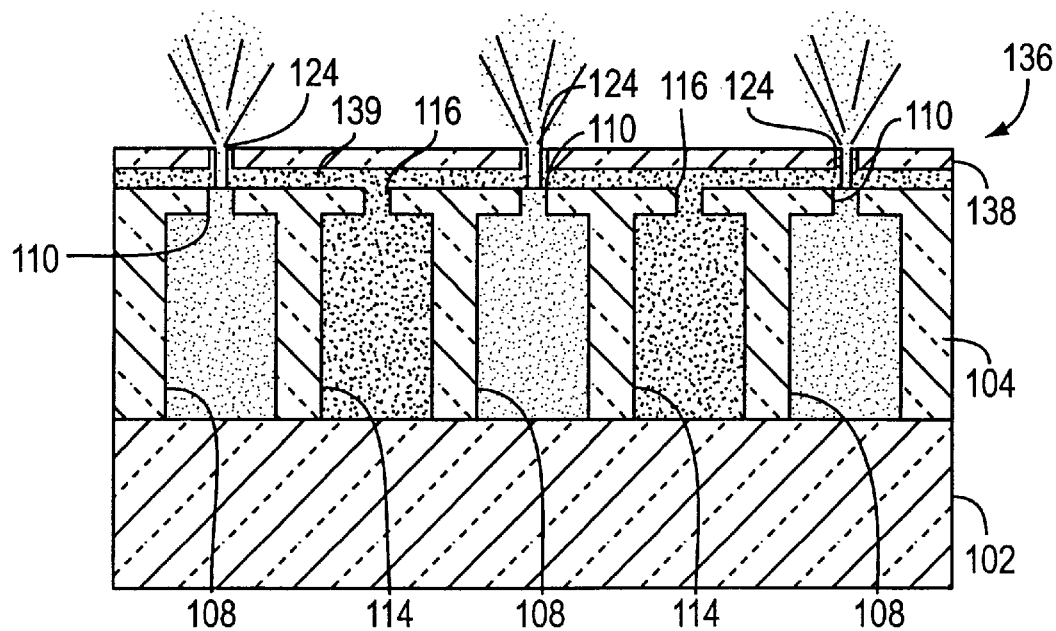

FIGS. 23 and 24 show a thirteenth embodiment 136 of the invention. This embodiment is the same as the seventh embodiment, except a substantially planar third layer 138 is provided over the second layer 104 to form pathways 139 that guide the liquid to the gas orifices 110 and confine the liquid to a very thin film. The third layer 138 preferably has a thickness sufficient to prevent rupture during operation and a length and width consistent with the first and second layers 102 and 104.

Liquid forced through the liquid orifices, at a flow rate of, for example, 10 milliliters per minute per square millimeter of spray array area, will move through the pathways 139 between the second and third layers 104 and 108 to atomizing edges 124. Gas forced through the gas orifices 110, at a velocity of, for example, 200 meters per second, breaks the liquid at the atomizing edges 124 into ligaments and breaks the ligaments into droplets through primary atomization.

The third layer 138 is preferably made by a conventional surface micromachining (sacrificial-layer) process on the side of the second layer 104. A rapidly-etchable sacrificial layer such as a phosphosilicate glass with high phosphorous content (or a soluble polymer material) is deposited over the second layer 104 after forming the orifices 110 and 116 in the second layer 104 (it is preferable that the orifices have closed bottoms at this state—not yet opened to the channels 108 and 114) with sacrificial layer thickness equal to the desired gap between the second layer 104 and third layer 138. The sacrificial layer is patterned and removed by etching in areas where the third layer 138 is to be attached to the second layer 104. Next, the third layer 138, such as polycrystalline silicon or an insoluble polymer layer such as polyimide, is deposited over the patterned sacrificial layer. The third layer 138 is patterned and removed by etching in areas where the third layer 138 is to have openings. The last step of surface micromachining is the removal by etching of the remaining sacrificial layer, thus opening the flow pathways 139 between the third layer 138 and the second layer 104.

Alternatively, the third layer 138 may be a bondable plastic film such as polyimide (e.g., KAPTON KJ) with pathways and orifices formed in the film by laser machining (such as an excimer laser), RIE or plasma etching, and/or hot embossing. Preferably, the pathways 139 for fluid flow between the third layer 138 and the second layer 104 are laser-cut or hot embossed in the bondable plastic film uniformly over a large area such that the precise alignment of the pathways 139 in the third layer 138 to the orifices in the second layer 104 is not required. After bonding the third layer 138 to the second layer 104, the gas orifice openings in the third layer 138 are etched or laser-cut.

In view of the pathways 139 provided by the third layer 138, the atomizing device shown in FIG. 24 could also be operated by flowing the liquid into the port 118 that was previously used for gas and by flowing the gas into the port 120 that was previously used for liquid. When switching the gas and the liquid, it is preferable that the liquid orifices have high-velocity gas flow all around their perimeters, so that thick accumulations of liquid are not allowed to build up.

Figure 15:
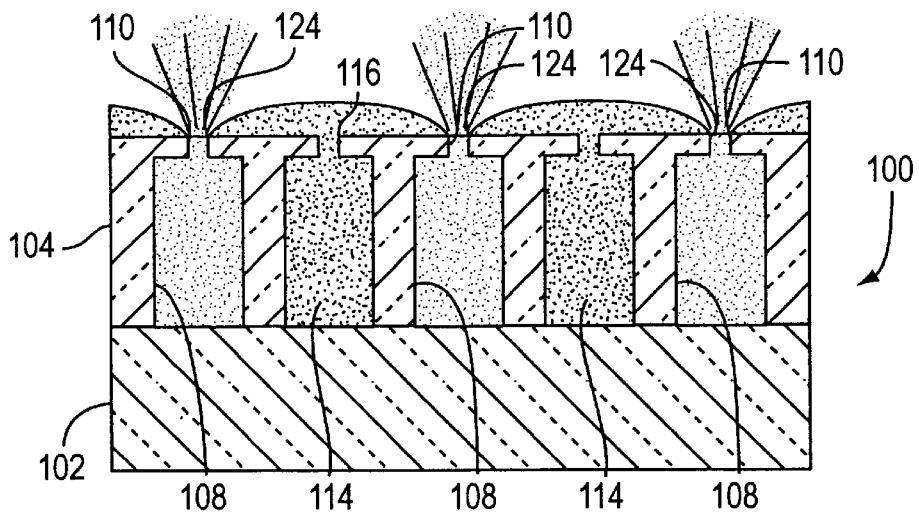
Figure 16:
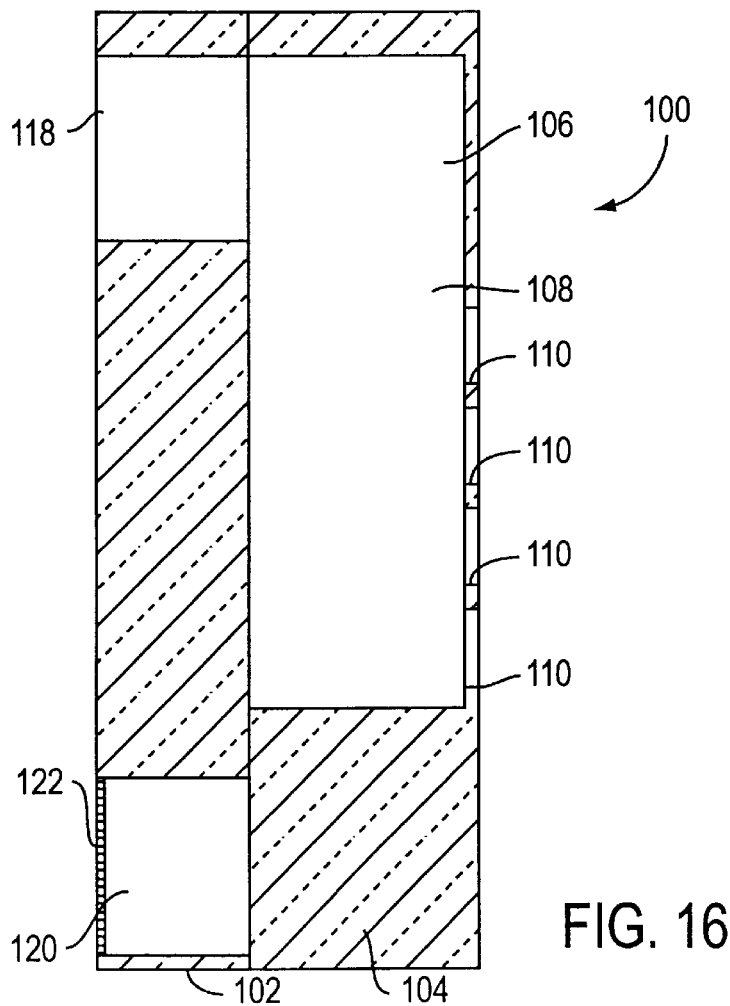
Figure 25:
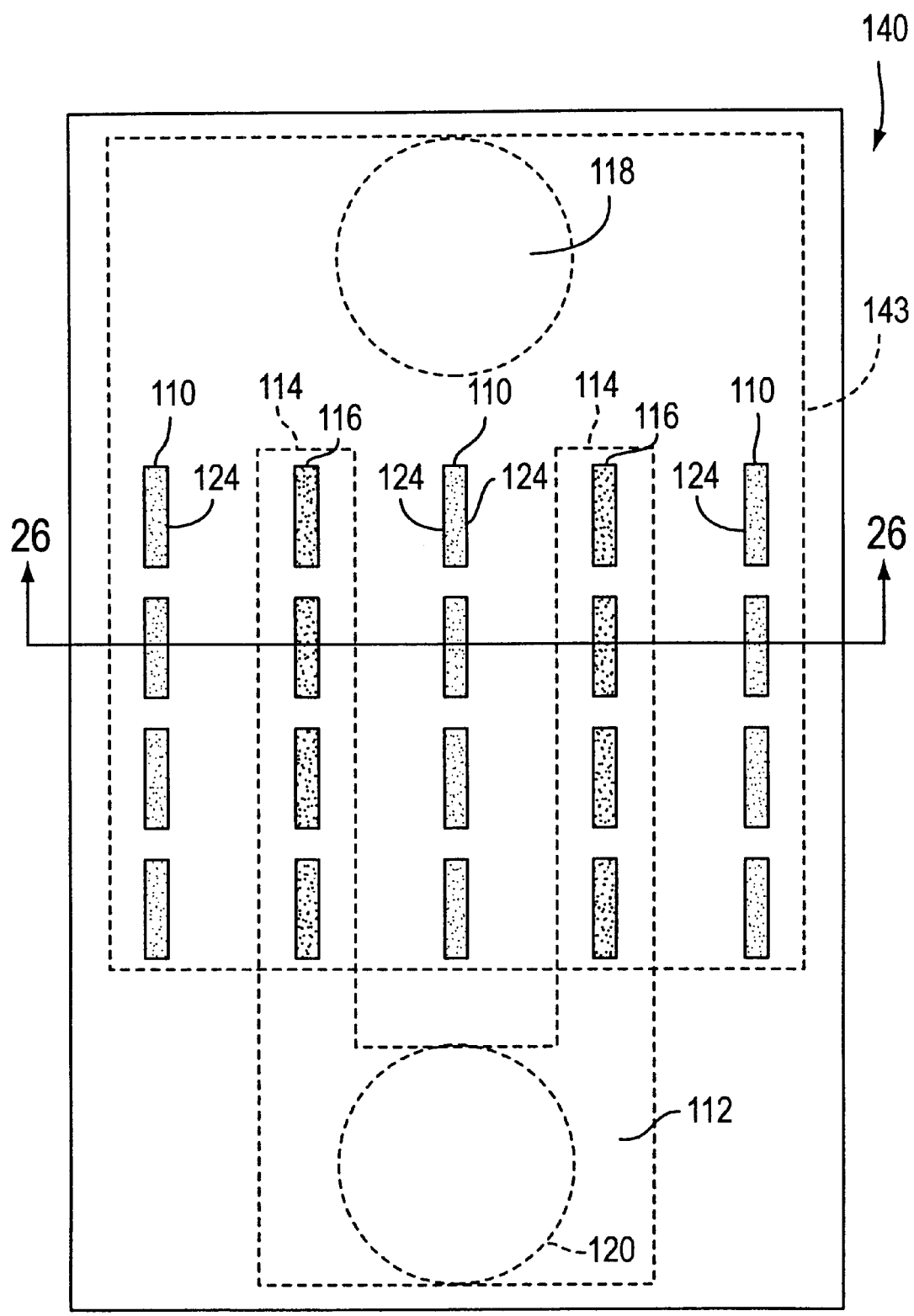
Figure 26:
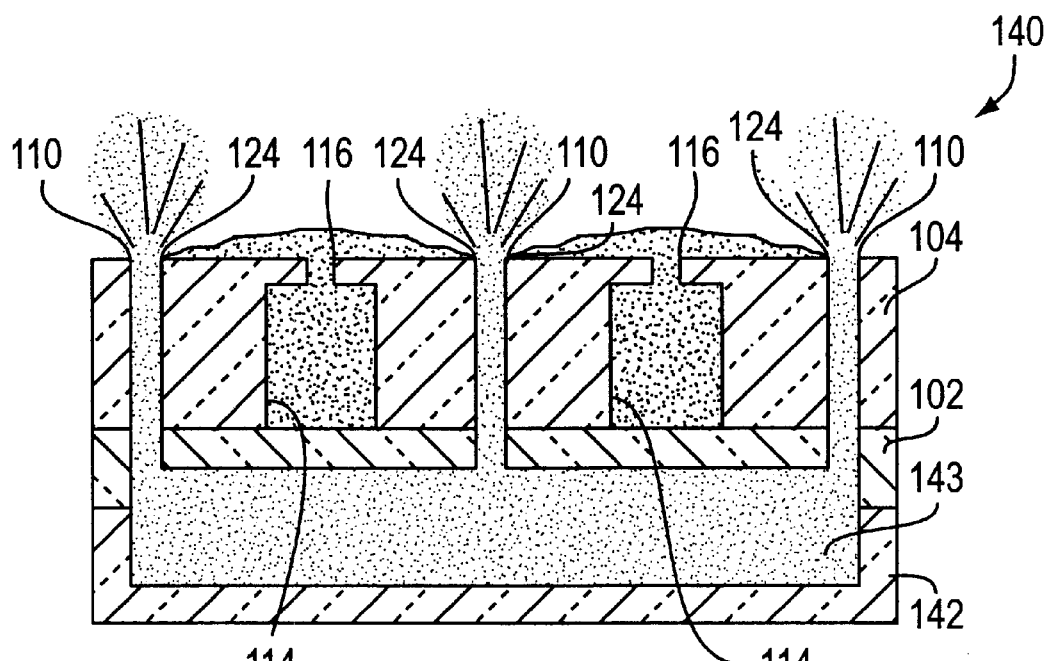

FIGS. 25 and 26 show a fourteenth embodiment 140 of an atomizing device. This embodiment is similar to the seventh embodiment shown in FIGS. 14 to 16. However, this fourteenth embodiment has a different gas supply network. Specifically, the atomizing device 140 includes a substantially planar plenum layer 142, which forms a plenum 143 for gas. The gas port 118 supplies gas from a gas reservoir to the plenum 143.

Each of the first and second layers 102 and 104 preferably has a length and a width determined by the desired liquid atomization rate (based on a chip rating such as 10 milliliters per minute per square millimeter of array), and a thickness within the standard range for silicon wafers (e.g., 500 micrometers) used for bulk micromachining. The plenum layer preferably is silicon, although it could be formed of other materials such as PYREX.

The gas orifices 110 formed in a surface of the second layer have a significantly greater thickness than in the seventh embodiment. These gas orifices 110 extend through the first and second layers 102 and 104 so as to be in fluid communication with the plenum 143. The gas orifices 110 preferably have the same length and width as in the seventh embodiment. The liquid orifices 116 and liquid channels 114 preferably have the same dimensions as in the seventh embodiment.

Liquid forced through the liquid orifices 116 at, for example, a flow rate of 10 milliliters per minute per square millimeter of spray array area, will move across the surface of the second layer 104 to atomizing edges 124 of the gas orifices 110. Gas forced through the gas orifices 110, at a velocity of, for example, 200 meters per second, breaks the liquid at the atomizing edges 124 into ligaments and breaks the ligaments into droplets through primary atomization.

The atomizing device 140 of this fourteenth embodiment can be produced in batches on wafers, similar to the atomizing device of the first embodiment. The inner surfaces of each layer are preferably formed using a vertical-wall micromachining process. The layers are then aligned and connected by silicon fusion bonding to form the atomizing device.

Figure 27:
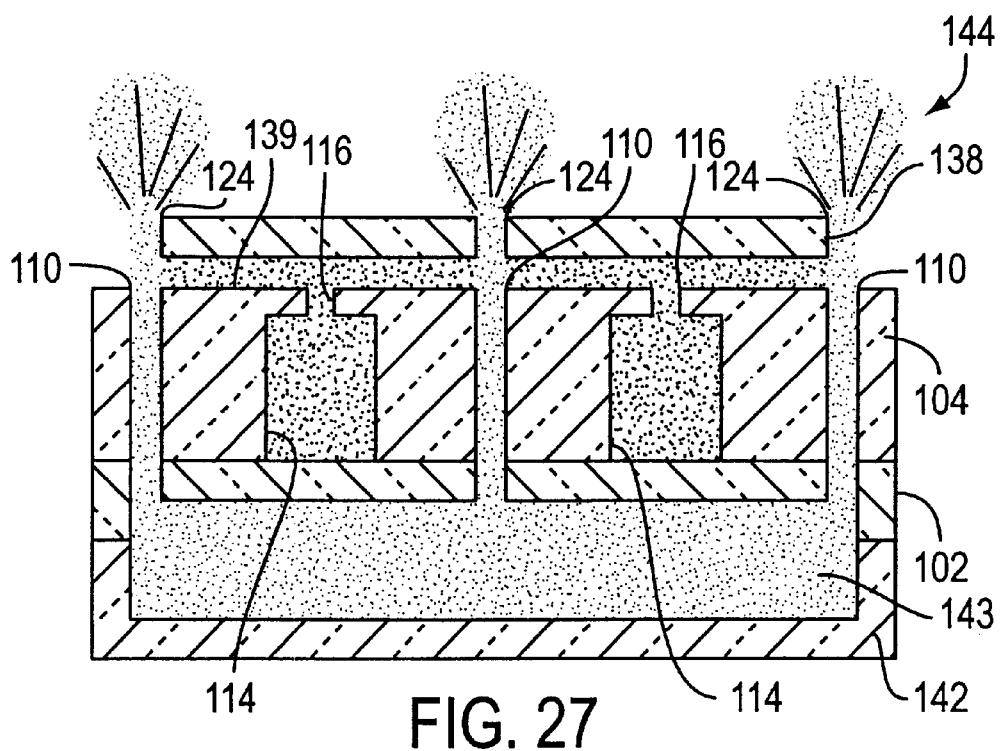

FIG. 27 shows a fifteenth embodiment 144 of the invention. This embodiment is the same as the fourteenth embodiment, except a substantially planar third layer 138 is provided over the second layer 104 to form pathways 139 that guide the liquid to the gas orifices 110. The third layer 138 preferably has a thickness sufficient to prevent rupture during operation, and a length and width consistent with the first and second layers 102 and 104.

Liquid forced through the liquid orifices at, for example, a flow rate of 10 milliliters per minute per square millimeter of spray array area, will move across the surface of the second layer 104 to atomizing edges 124. Gas forced through the gas orifices 110, at a velocity of, for example, 200 meters per second, breaks the liquid at the atomizing edges into ligaments and breaks the ligaments into droplets through primary atomization.

The third layer 138 is micromachined and attached to the second layer 104 by the process described above in regard to the thirteenth embodiment.

Figure 28:
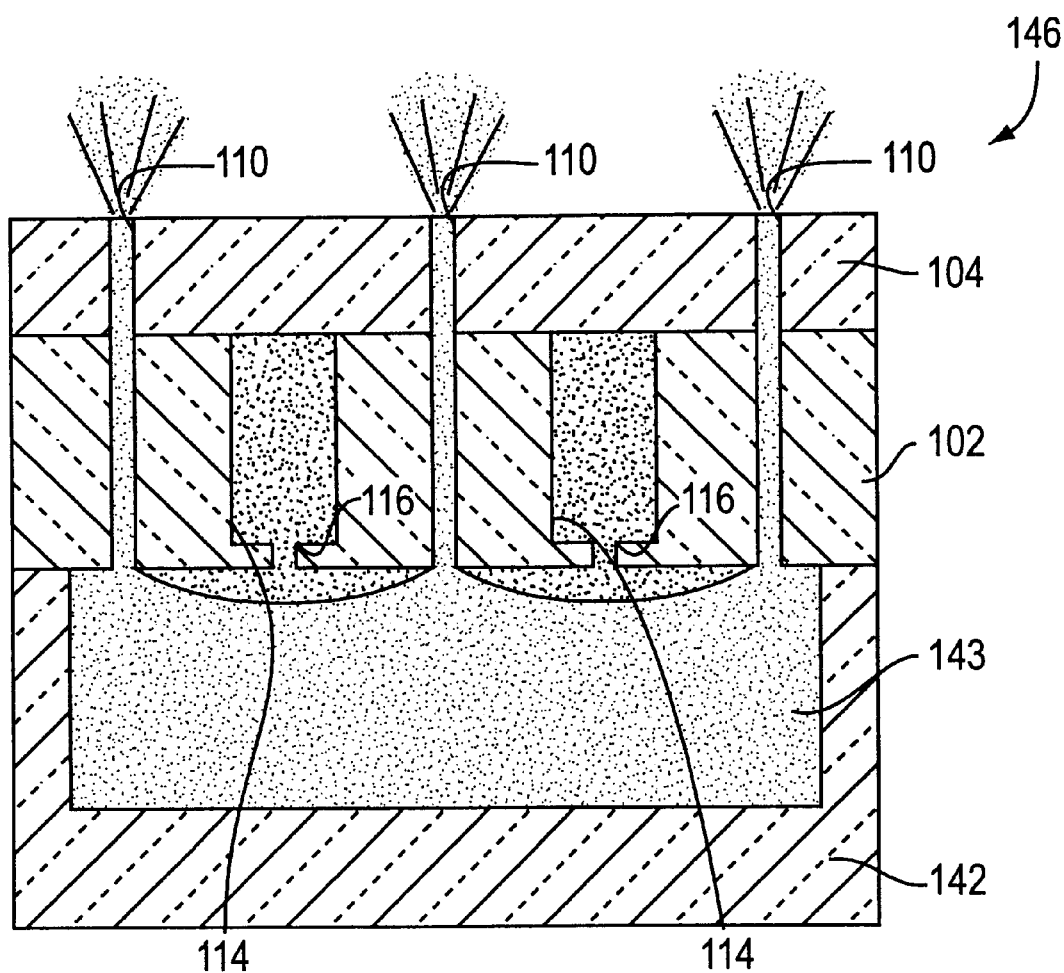
Figure 30:
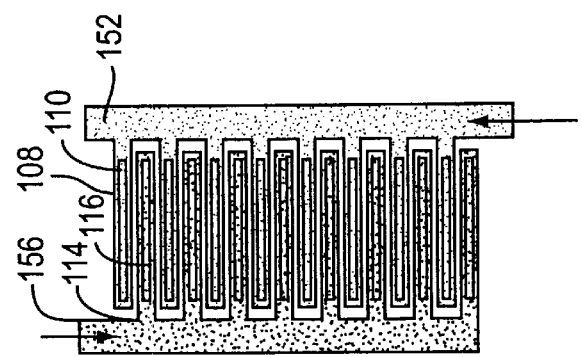

A sixteenth embodiment of an atomizing device 146 is shown in FIG. 28. This embodiment includes a substantially planar plenum layer 142, a substantially planar first layer 102, and a substantially planar second layer 104. Each of the first and second layers 102 and 104 preferably has a length and a width determined by the desired liquid atomization rate (based on a chip rating such as 10 milliliters per minute per square millimeter of orifices), and a thickness within the standard range for silicon wafers (e.g., 500 micrometers) used for bulk micromachining. The plenum layer 142 is preferably formed from silicon, but it can be made from other materials, such as PYREX.

The plenum layer 142 and first layer 102 form a plenum 143 for gas. A gas port (not shown) supplies gas from a gas reservoir to the plenum 143.

Gas orifices 110 are formed in a surface of the second layer 104. These gas orifices extend through the first and second layers 102 and 104 and are in fluid communication with the plenum 143. The gas orifices 110 preferably have the same length and width dimensions as in the seventh embodiment, but their thickness is significantly greater than in the seventh embodiment.

The first and second layers 102 and 104 form a liquid passage (not shown) and a plurality of liquid channels 114 that supply liquid to a plurality of liquid orifices 116 formed in the first layer 102. The liquid orifices 116 and liquid channels 114 preferably have the same dimensions as in the seventh embodiment. The liquid is supplied to the liquid passage through a liquid port (not shown), which preferably has a filter (not shown), such as the filter of the seventh embodiment.

Liquid forced through the liquid orifices 116 at, for example, a flow rate of, for example, 10 milliliters per minute per square millimeter of the spray array area, will move across the surface of the first layer 102 to the entrances of the gas orifices 110. Gas in the plenum 143 is forced into the gas orifices 110, at a flow velocity of, for example, 200 meters per second, and draws the liquid through the gas orifice to the gas orifice exit. As the liquid moves along the gas orifice walls, some of the liquid is broken into ligaments and is atomized. The remaining liquid will be brought to the exit of the gas orifice (the atomizing edge). The gas flow breaks the liquid at the atomizing edges into ligaments and breaks the ligaments into droplets through primary atomization.

The atomizing device 146 of this sixteenth embodiment can be produced in batches on wafers, similar to the atomizing device of the first embodiment. The inner surfaces of each layer 142, 102, and 104 are preferably formed using a vertical-wall micromachining process. The plenum, first, and second layers are then aligned and connected by silicon fusion bonding to form the atomizing device. If PYREX is to be used for a plenum layer, it is joined to silicon layers by anodic bonding.

A seventeenth embodiment 148 of the invention is shown in FIGS. 29 to 34. This embodiment is similar in many respects to the seventh embodiment shown in FIG. 15. However, this seventeenth embodiment has a relatively complex supply network including conduits, passages, and interdigitated supply channels, which supply gas and liquid to gas and liquid orifices.

Figure 29:
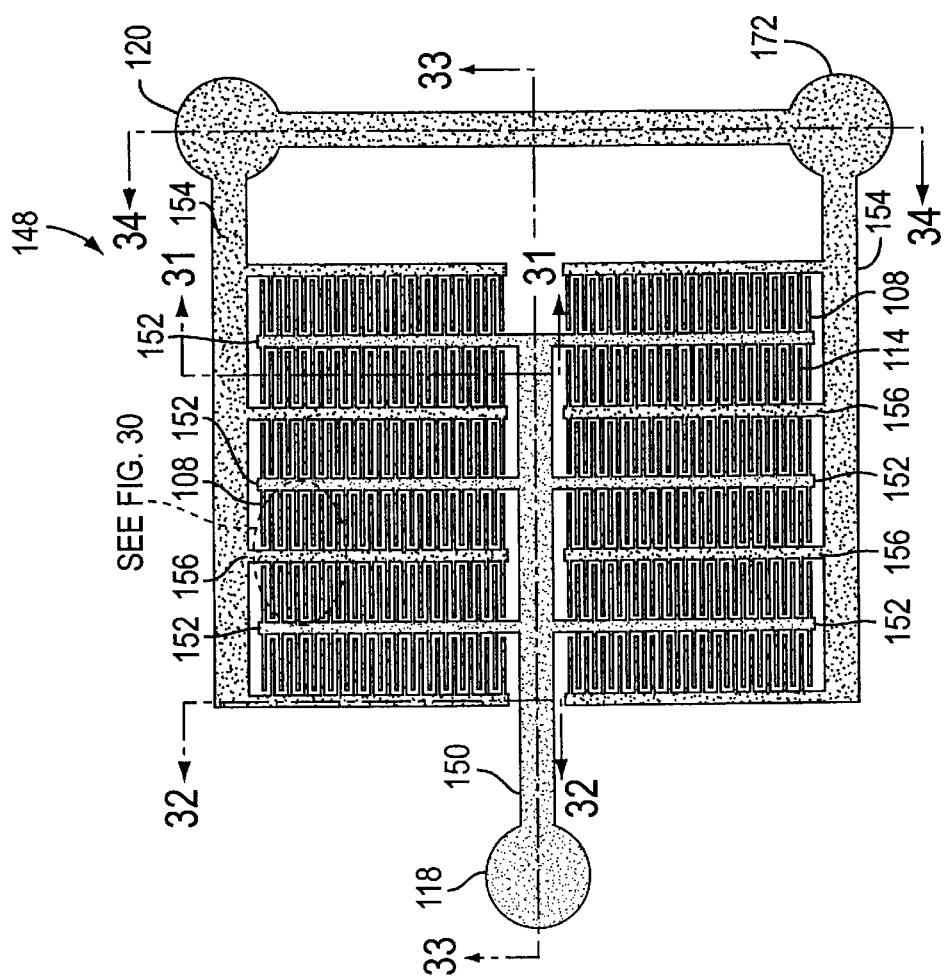

As shown generally in FIG. 29, gas enters through a gas port 118 and flows through a conduit 150 to smaller passages 152. The gas from the passages 152 flows into even smaller channels 108, which supply the gas to gas orifices 110. Similarly, the liquid enters through a liquid port 120, flows through conduits 154, flows through smaller passages 156, and flows through even smaller channels 114, which supply the liquid to liquid orifices 116.

Figure 31:
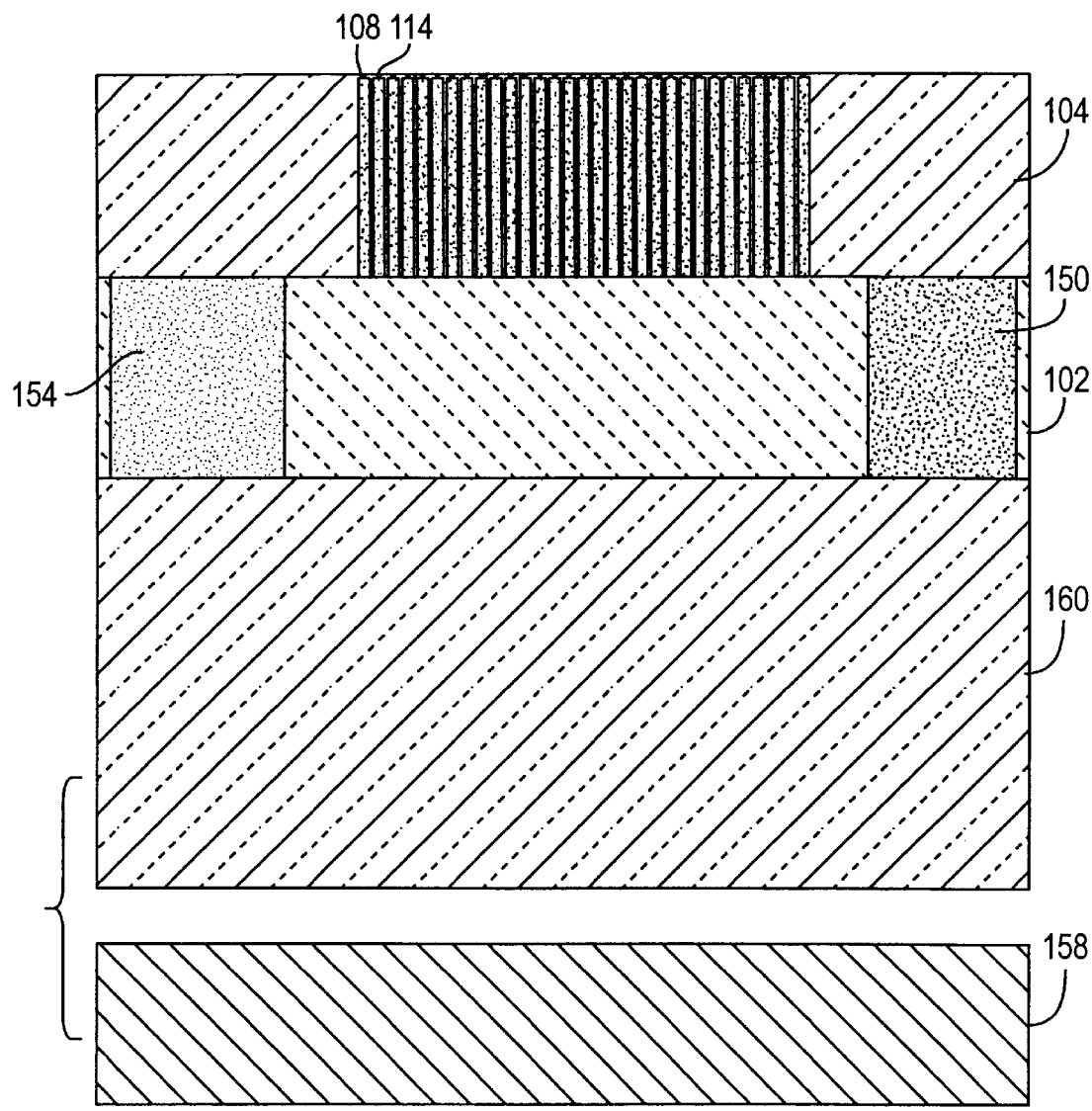
Figure 32:
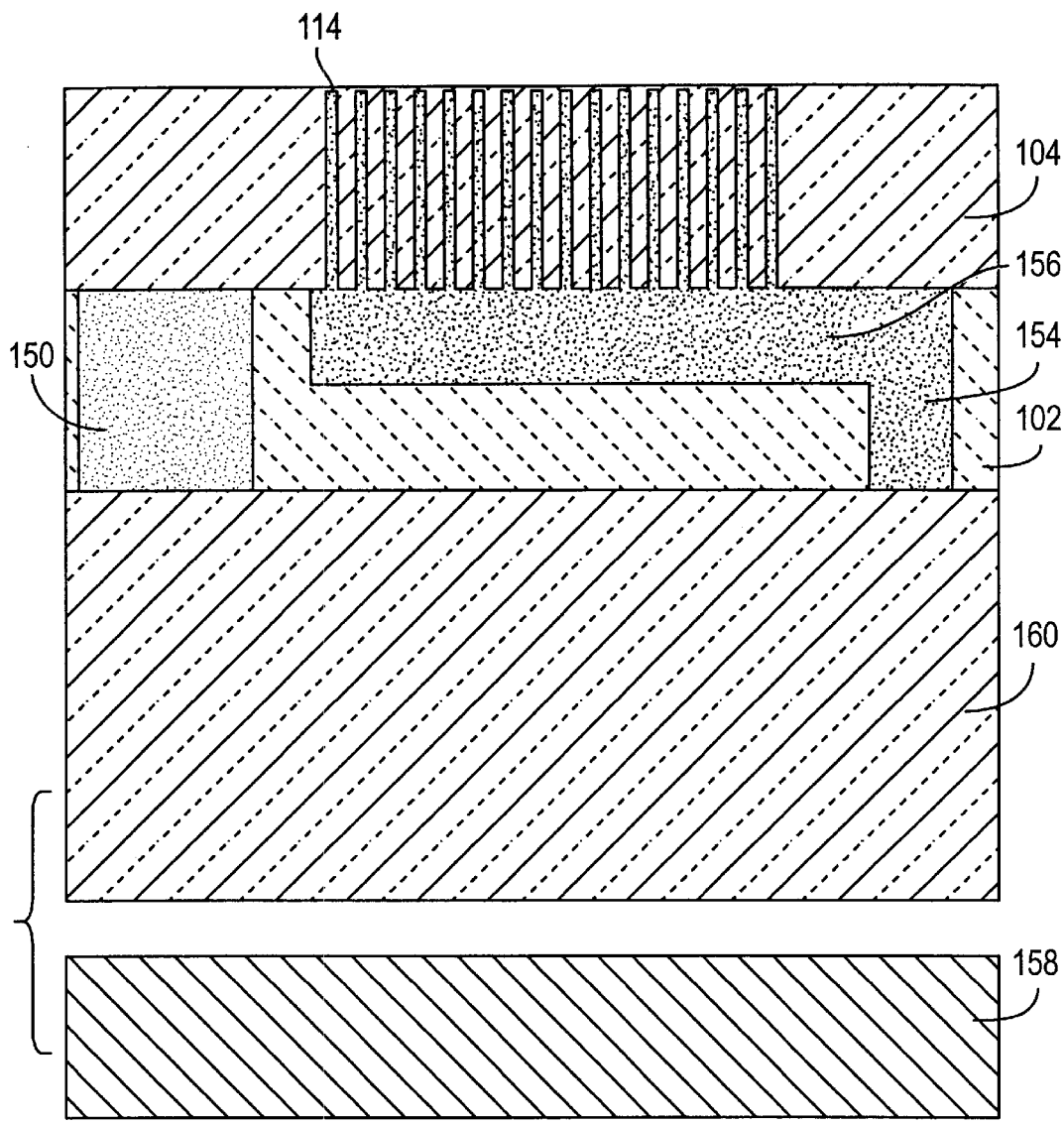

As shown in FIG. 31, the atomizing device includes a connection block 158, a substantially planar filter layer 160, a substantially planar first layer 102, and a substantially planar second layer 104. Each of the filter layer 100, first layer 102, and second layer 104 preferably has a length and a width determined by the desired liquid atomization rate (based on a chip rating such as 10 milliliters per minute per square millimeter of orifices), and a thickness within the standard range for silicon wafers (e.g., 500 micrometers) used for bulk micromachining (although the first layer is preferably made of PYREX).

The connection block 158 has a gas port 118 and a liquid port 120 for connection to gas and liquid reservoirs. The connection block 158 is preferably made of steel or other machinable material that is impervious to the liquid.

Figure 33:
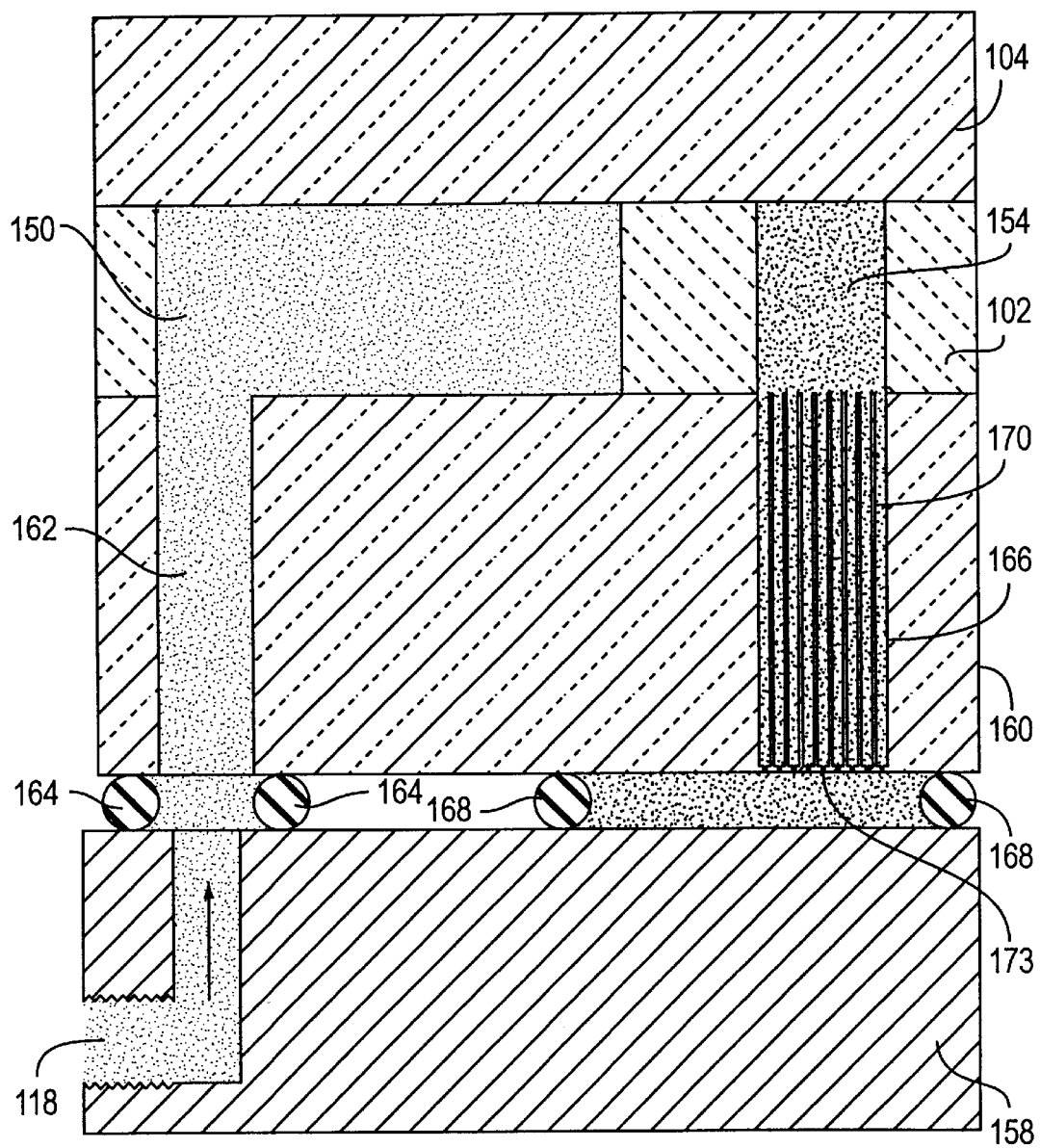

As shown in FIG. 33, the filter layer 160 has a gas main supply 162 that feeds gas to the gas conduit 150. The gas main supply 162 is connected to the gas port 118 through an O-ring 164.

The filter layer 160 also has a liquid main supply 166 that feeds the liquid to the liquid conduits 154. The liquid main supply 166 is connected to the liquid port 120 through an O-ring 168.

Figure 34:
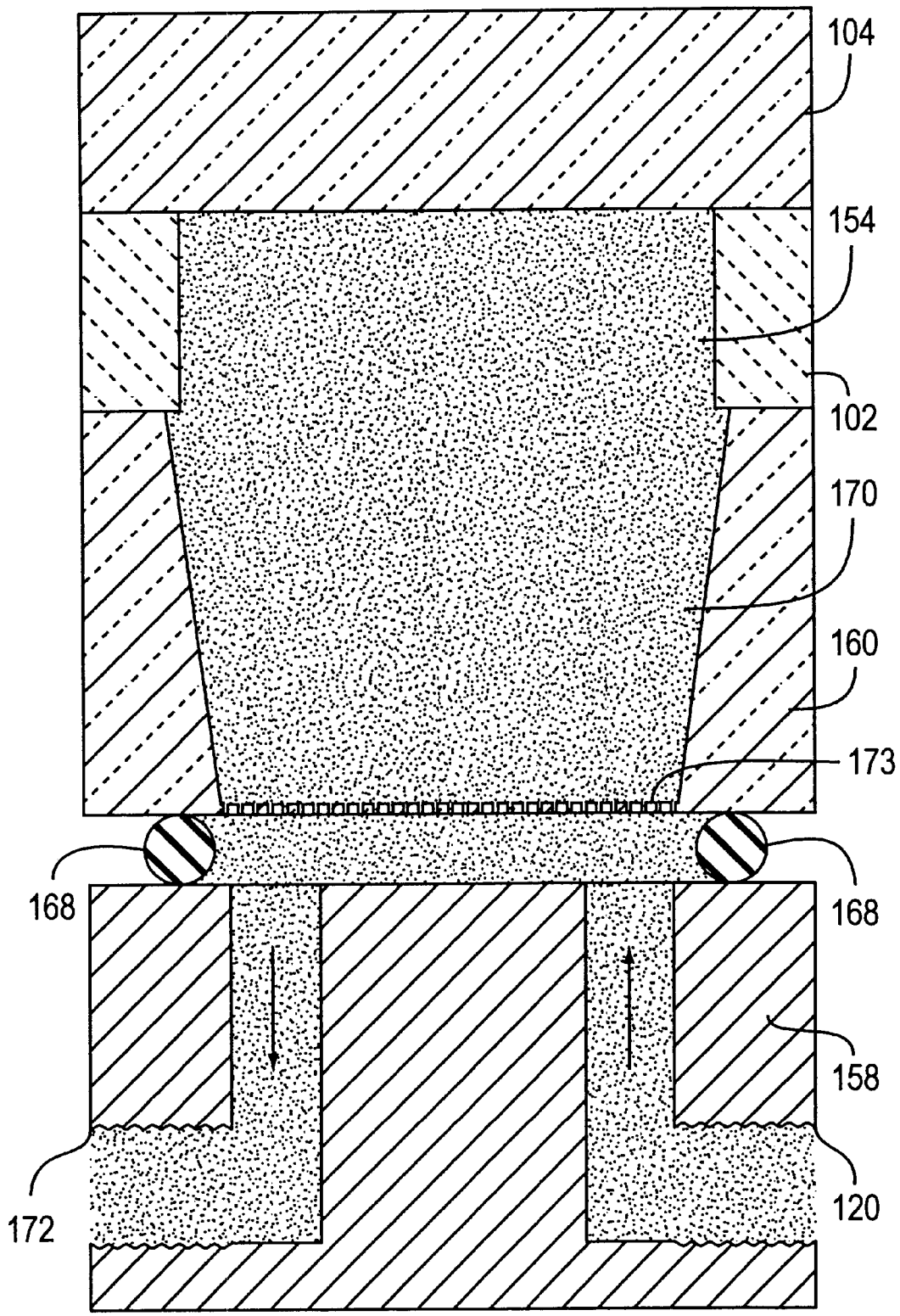

The liquid main supply 166 includes a plurality of elongated channels 170 (FIGS. 33 and 34). Each of these channels 170 has filter pores 173 at its inlet. These filter pores 173 can, for example, be circular or square, and preferably have widths of less than or equal to ⅓ of the width of the liquid orifices 116. As shown in FIG. 34, the filter pores 173 can be flushed by flowing fluid into the liquid port 120 and through a flushing port 172. During normal operation, this flushing port 172 is closed, unless a recirculating liquid pump system is used.

Unlike the second layer 104 and filter layer 160, the first layer 102 is preferably made of PYREX. The first layer 102 has gas and liquid conduits 150 and 154 (FIG. 31) that are in fluid communication with the gas and liquid main supplies 162 and 166. The first layer 102 also has gas passages 152 (not shown in section) and liquid passages 156 (FIG. 32) that are in fluid communication with the gas and liquid conduits 150 and 154.

The second layer 104 has gas and liquid channels 108 and 114 (FIG. 31) that are in fluid communication with the gas and liquid passages 152 and 156 and are preferably interdigitated. The gas and liquid channels 108 and 114 provide gas and liquid to gas and liquid orifices 110 and 116 formed in a surface of the second layer 104. The gas and liquid channels 108 and 114 and the gas and liquid orifices 110 and 116 (FIG. 30) preferably have the same dimensions as the channels and orifices of the seventh embodiment.

Liquid forced through the liquid orifices 116, at a flow rate of, for example, 10 milliliters per minute per square millimeter of spray array area, will move across the surface of the second layer 104 to atomizing edges of the gas orifices 110. Gas forced through the gas orifices 110, at a flow velocity of, for example, 100 meters per second, breaks the liquid at the atomizing edges into ligaments and breaks the ligaments into droplets through primary atomization.

The atomizing device 148 of this seventeenth embodiment can be produced in batches on wafers, similar to the atomizing device of the first embodiment. The inner surfaces of each layer are preferably formed using a vertical-wall micromachining process. However, the inner surfaces of the first layer 102, which is formed of PYREX, are preferably formed by ultrasonic machining. The filter, first, and second layers are then aligned and connected by anodic bonding, which is a preferred process for connecting silicon to PYREX. The gas and liquid ports 118 and 120 of the connection block 158, which is made of steel, are preferably formed by common machining methods, and the plenum, first, and second layers are then connected to the connection block through O-rings 164 and 168 (or a sealing gasket) to form the atomizing device.

Having described preferred implementations of the invention, it is appropriate to address principles underlying the foregoing and other implementations of the invention.

It has been determined, in connection with the present invention, that the above-mentioned atomizing devices cause primary atomization of the liquid into droplets having a Sauter mean diameter smaller than 35 micrometers at a gas-liquid mass ratio of less than or equal to 0.2. A Sauter mean diameter of less than 35 micrometers occurs because of the thinness of the layer of liquid from which the ligaments are formed. A gas-liquid mass ratio of less than 0.2 occurs because of the narrowness of the gas orifices. This combination allows small droplets to be formed while using less gas to atomize a particular volume of liquid.

Additionally, the above-mentioned atomizing devices cause primary atomization of the liquid into droplets having a Sauter mean diameter smaller than a critical diameter $D_{max}$ of the droplets. $D_{max}$ is the maximum stable diameter of a droplet:

$$D_{max} = 8\sigma/(C_D \rho_A U_R^2)$$

where:
  $\sigma$: surface tension of the liquid;
  $C_D$: drag coefficient of a droplet having a diameter equal to the critical diameter;
  $\rho_A$: density of the gas; and
  $U_R$: relative velocity between the droplet and the gas.

Primary atomization yielding droplets smaller than the critical diameter occurs because of the thinness of the liquid at the atomizing edge. This results in a somewhat smaller average droplet size, and also in a narrower droplet size distribution.

The atomizing devices also form detached ligaments of liquid having an average width smaller than 5 times the critical diameter $D_{max}$ of the droplets. This occurs because of the thinness of the liquid at the atomizing edge. This is advantageous because there is less reliance on secondary atomization.

The atomizing devices flow gas against the liquid and can achieve efficient atomization at a velocity of less than or equal to 100 meters per second. This is possible because of the thinness of the liquid at the atomizing edge. This results in less turbulence in the spray system.

In each of the above-mentioned atomizing devices, the ratio of an atomizing perimeter of each orifice to a cross-sectional area of the orifice is at least 8,000 meters$^{-1}$. This is advantageous because the high-speed gas flow is concentrated at the atomizing edge where the primary atomization takes place.

Additionally, the gas-liquid mass ratio in each embodiment is preferably less than or equal to 0.2 and, more preferably, less than or equal to 0.1. This ratio provides better performance by limiting the amount of gas required.

Additionally, these atomizing devices can be formed by manufacturing techniques that permit batch production, thus allowing for simultaneous production of hundreds to possibly more than a million atomizing devices in a single layer. Since the atomizing devices need not be separated after being formed in a batch, the present invention also provides for the formation of large arrays of orifices. This is important for obtaining high flow rates, or for scaling up the flow rate to a production environment.

These atomizing devices are also made by methods that allow each device to be made precisely the same and in accordance with precise dimensional requirements. This is important for obtaining reproducible spray characteristics from one atomizing device to the next, or from one batch to the next.

The present invention provides high pressure operation of large arrays with very thin structures by keeping the ratio of (a) channel width to (b) orifice thickness low enough so that cracking and/or rupturing do not occur. For example, a 4 micrometer thick orifice can operate at 100 psi without rupturing when the channel width is limited to 100 micrometers.

The present invention supplies fluid to large arrays of orifices, without requiring a lot of space, by using efficient, space-saving, supply networks. These networks can be made efficiently via batch production. Tens, hundreds, or even thousands of supply channels can be formed simultaneously in a layer or stack of layers, rather than being formed one channel at a time. Also, multiple layers of supply channels can be formed. This is important for supplying large arrays of orifices.

The present invention also allows multifluid arrays in which neighboring orifices release different fluids.

Figure 35:
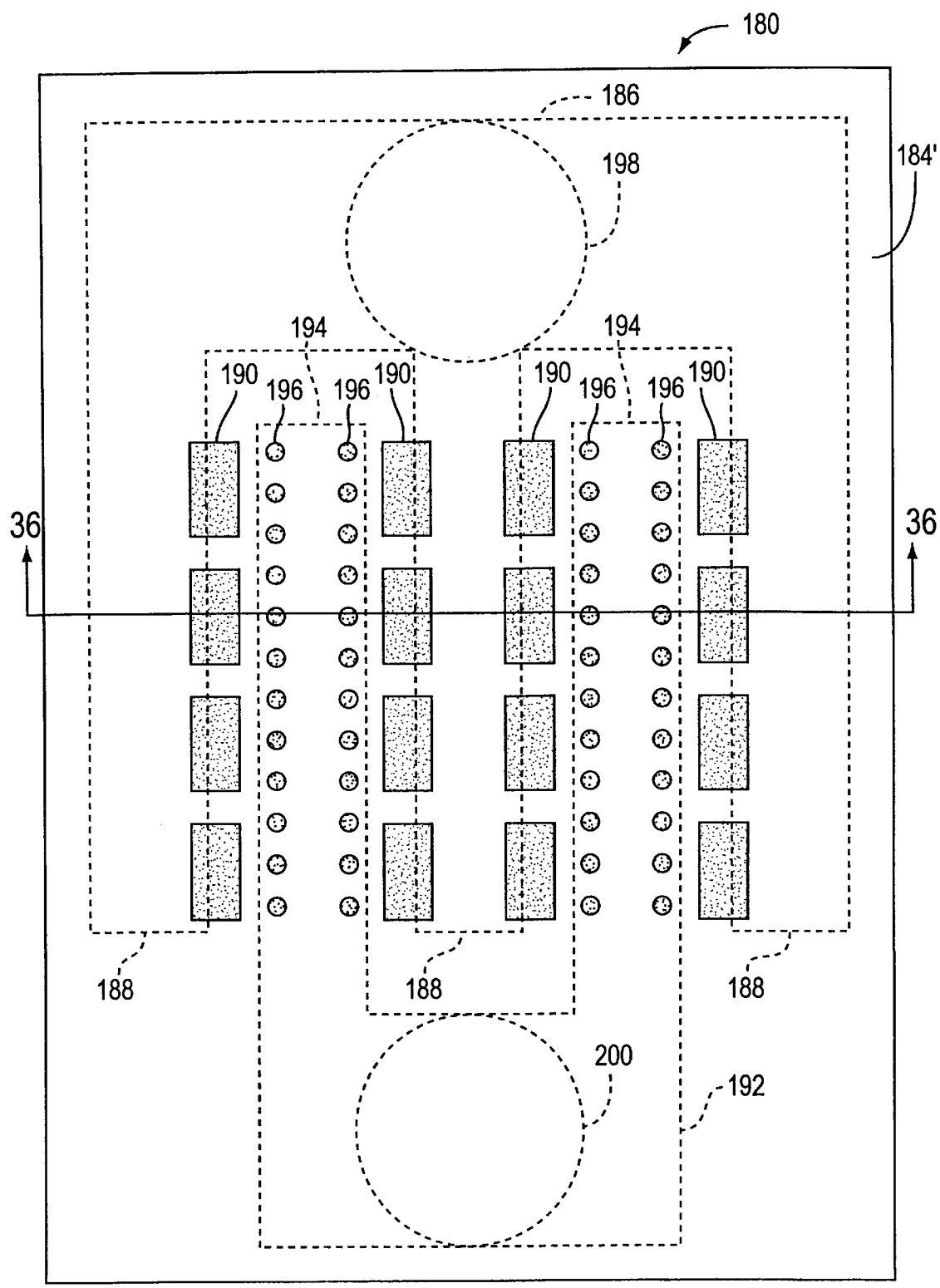
Figure 36:
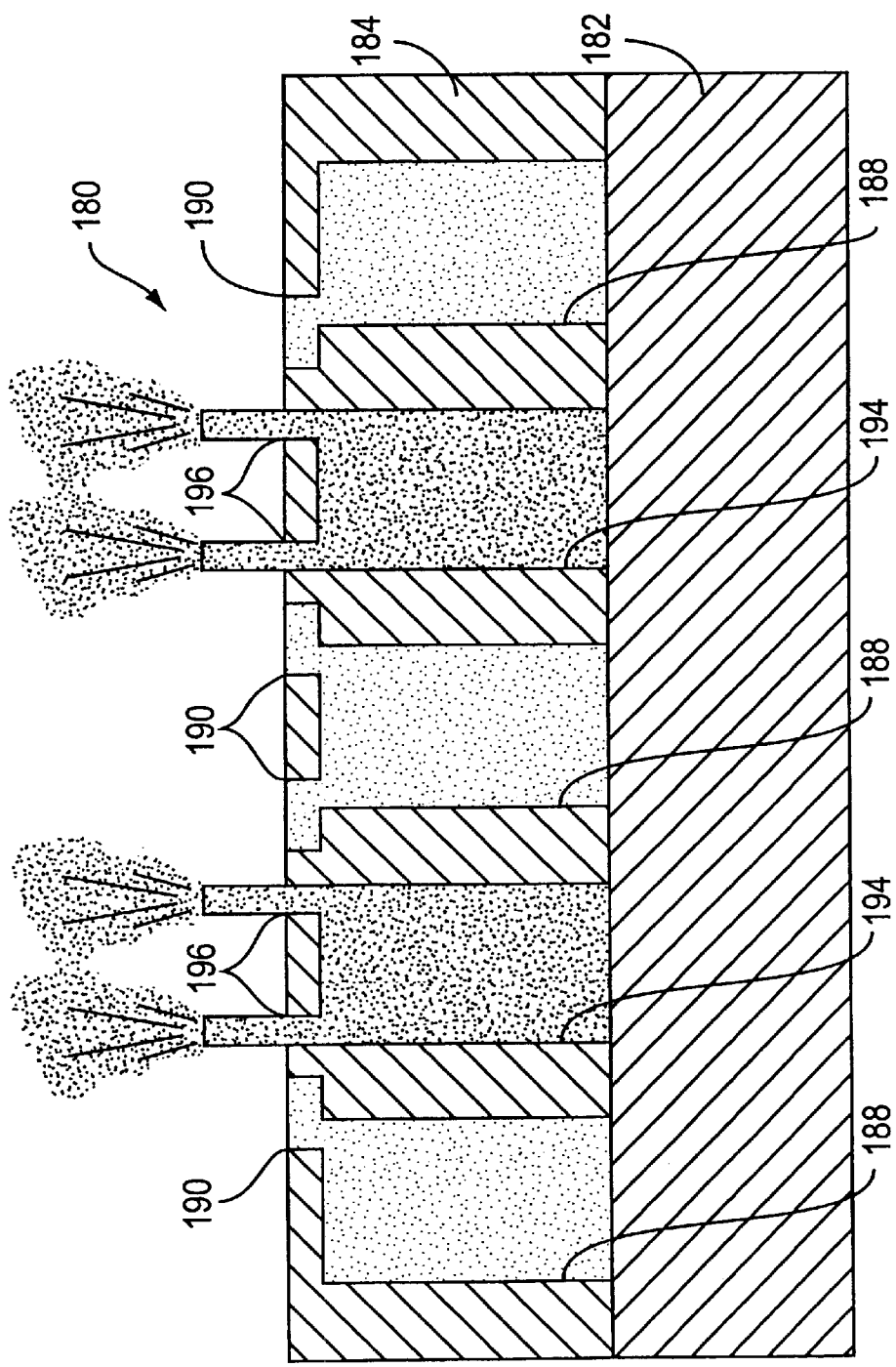

An eighteenth embodiment of an atomizing device according to the present invention is shown in FIGS. 35 and 36. This embodiment operates differently from the preceding embodiments. This embodiment operates by first wind- and second wind-induced breakup of liquid streams or jets.

This eighteenth embodiment 180 includes a substantially planar first layer 182 and a substantially planar second layer 184. Each of the first and second layers 182 and 184 preferably has a length of 5 millimeters, a width of 5 millimeters, and a thickness of 1 millimeter.

The first and second layers 182 and 184 form a gas passage 186 and a plurality of gas channels 188 that supply gas to a plurality of gas orifices 190 formed in the second layer 184. The first and second layers 182 and 184 also form a liquid passage 192 and a plurality of liquid channels 194 that supply liquid to a plurality of liquid orifices 196 formed in the second layer 184. As shown in FIG. 36, the gas channels 188 and liquid channels 194 are preferably interdigitated.

Gas is supplied to the gas passage 186 through a gas port 198. Similarly, liquid is supplied to the liquid passage 192 through a liquid port 200. The liquid port 200 has a filter (not shown) at its inlet to remove impurities from the liquid to prevent clogging of the liquid orifices 196. The filter preferably has extremely fine filter pores that can, for example, be circular or square. The filter pores preferably have widths less than or equal to ⅓ the width of the liquid orifices 196.

The liquid orifices 19 preferably have compact cross-sections (e.g., circles or squares), with thickness less than four times the liquid orifice width.

In this embodiment sufficient liquid pressure is applied to start and maintain liquid jets from these liquid orifices 196. The gas flow is arranged so that after the jets have left the liquid orifices 196, the gas interacts with the jets with sufficient differential velocity so as to accelerate the breakup before the jet breaks up due to its own internal instability (Rayleigh breakup). The liquid jet flow velocity is preferably 10 meters per second and the gas flow velocity is preferably greater than 100 meters per second.

The breakup is induced by the wind, i.e., the substantially larger velocity of the gas impinging on the liquid jet relative to the velocity of the liquid jet. This wind-induced breakup may be described in terms of first wind and second wind. In first wind breakup, liquid jet oscillations are still mainly dilational, and the droplet diameters formed are about the same as the jet diameter. In second wind breakup, liquid jet oscillations are mainly sinuous, and the droplet diameters formed are much less than the jet diameter. Benefits of this wind-induced breakup include (1) the droplets formed are smaller than the droplets due to Rayleigh breakup and (2) the droplet size distribution is intermediate between Rayleigh breakup (monodisperse) and typical atomization (very broad size distribution).

The atomizing device 180 of this embodiment can be produced in batches on wafers, similar to the atomizing device of the first embodiment. The inner surfaces of each layer are preferably formed using a vertical-wall micromachining process. The first and second layers 182 and 184 are then connected by silicon fusion bonding, or by anodic bonding (if the first layer 182 is PYREX) to form the atomizing device 180.

The atomizing device 180 of this embodiment can be adapted to utilize the supply networks of the fourteenth and seventeenth embodiments.

It will be apparent to those skilled in the art that various modifications and variations can be made in the apparatus of the present invention without departing from the scope or spirit of the invention.

Other embodiments of invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of atomizing a liquid, comprising the steps of:

flowing a liquid over an atomizing edge of an orifice; and flowing a gas against the liquid to cause atomization of the liquid into droplets having a Sauter mean diameter smaller than 35 micrometers at a gas-liquid mass ratio of less than or equal to 0.2.

2. The method of claim 1, wherein the gas is flowed against the liquid at a velocity of less than or equal to 100 meters per second.

3. The method of claim 1, wherein the gas flowed against the liquid forms detached ligaments of liquid having an average width smaller than 5 times a critical diameter $D_{max}$ of the droplets, where:

$$D_{max}=8\sigma/(C_{D\rho A}U_R^2)$$

where:

$\rho$: surface tension of the liquid;

$C_D$: drag coefficient of a droplet having a diameter equal to the critical diameter;

$\sigma_A$: density of the gas; and $U_R$: relative velocity between the droplet and the gas.

4. The method of claim 1, wherein a ratio of a smallest atomizing perimeter of the orifice to a cross-sectional area of the orifice is at least 8,000 meters$^{-1}$.

5. A method of atomizing a liquid, comprising the steps of:

flowing a liquid film over an atomizing edge of an orifice; and flowing a gas against the liquid film to cause primary atomization of the liquid into droplets having a Sauter mean diameter smaller than a critical diameter $D_{max}$ of the droplets, where:

$$D_{max}=8\rho/(C_{D\sigma A}U_R^2)$$

where:

$\rho$:surface tension of the liquid;

$C_D$: drag coefficient of a droplet having a diameter equal to the critical diameter;

$\sigma_A$: density of the gas; and $U_R$: relative velocity between the droplet and the gas.

* * * * *